(12) United States Patent
Ueshima et al.

(10) Patent No.: US 7,839,382 B2
(45) Date of Patent: Nov. 23, 2010

(54) SENSING BALL GAME MACHINE

(75) Inventors: Hiromu Ueshima, Kusatsu (JP); Shuhei Kato, Kusatsu (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 0 days.

(21) Appl. No.: 11/595,865

(22) Filed: Nov. 13, 2006

(65) Prior Publication Data

US 2007/0091084 A1 Apr. 26, 2007

Related U.S. Application Data

(63) Continuation of application No. 09/856,175, filed on Jun. 4, 2001.

(30) Foreign Application Priority Data

Oct. 4, 1999 (JP) .................................. 11-283233

(51) Int. Cl.
G09G 5/00 (2006.01)
(52) U.S. Cl. ........................ 345/156; 463/36; 273/317.6
(58) Field of Classification Search ........................ None
See application file for complete search history.

(56) References Cited

U.S. PATENT DOCUMENTS 3,583,538 A * 6/1971 Hurley ........................... 463/3
4,372,557 A * 2/1983 Del Principe et al. ........... 463/3
5,414,256 A 5/1995 Gurner et al.
5,435,554 A 7/1995 Lipson
5,553,846 A * 9/1996 Frye et al. ..................... 473/455
5,741,182 A 4/1998 Lipps et al.
5,833,549 A 11/1998 Zur et al.
6,120,374 A * 9/2000 Akada et al. ..................... 463/3
6,157,898 A 12/2000 Marinelli
6,270,413 B1 * 8/2001 Aikawa et al. ................. 463/31
6,292,706 B1 * 9/2001 Birch et al. ..................... 700/91
6,312,335 B1 11/2001 Tosaki et al.
6,517,438 B2 2/2003 Tosaki et al.
6,545,661 B1 4/2003 Goschy et al.
6,929,543 B1 8/2005 Ueshima et al.

FOREIGN PATENT DOCUMENTS

| JP | 7-282265 | 10/1995 |
| JP | 2518288 | 9/1996 |
| JP | 3051647 | 6/1998 |
| JP | 10-214155 | 8/1998 |
| JP | 11-14395 | 1/1999 |

* cited by examiner

*Primary Examiner*—Peter-Anthony Pappas
(74) *Attorney, Agent, or Firm*—Jackson Patent Law Office

(57) ABSTRACT

A sensing baseball game apparatus (10) has a game machine (12) connected to a television monitor (18). A bat input device (32) is provided with an acceleration sensor. An acceleration signal is transmitted by an infrared-ray LED (34) to an infrared-ray receiving part of the game machine (12) whereby the game machine (12) determines a moving speed of the bat input device (32) to calculate a moving parameter of a ball to be batted. Accordingly, a batted ball is moved in the game scene according to the parameter.

9 Claims, 18 Drawing Sheets

SENSING BALL GAME MACHINE

CROSS-REFERENCE TO RELATED APPLICATION

This application is a continuation of application Ser. No. 09/856,175, filed Jun. 4, 2001. The disclosures of the prior application is hereby incorporated herein in it's entirety by reference.

FIELD OF THE INVENTION

This invention relates to sensing ball game apparatuses. More particularly, the invention relates to a novel sensing ball game apparatus to be played by using actual ball game tools, such as bats, balls and rackets, to cause a change in a display image, particularly in a ball character, on the television monitor due to the movement of such a tool.

PRIOR ART

For playing a baseball, a vast ground is needed to enjoy an actual ball game of this kind. Besides, many other athletes must be gathered together. There encounter difficulties in readily enjoying an actual ball game.

On the other hand, ball games, such as baseball and soccer games, among television games, have been recently placed in practical use in order to offer ready enjoyment of the ball game. In the television game of this kind, a video game console loaded with game software is connected to a television monitor, to display a baseball or soccer ground on the monitor screen. The game player is allowed to manipulate the switches provided on a controller, in controlling a moving character on the screen, e.g. a bat, ball and athlete.

In the conventional television ball game, the game player merely operates the operation switches without actually swinging a bat or kicking a ball. This makes the ball game short of realistic feeling in game play.

SUMMARY OF THE INVENTION

Therefore, it is a primary object of the present invention to provide a novel sensing ball game apparatus for enjoying a ball game with a realistic feeling while using a television monitor.

Another object of the invention is to provide a sensing ball game apparatus for playing a game while using a television monitor, actual game tools or the analogously formed game tools.

Another object of the invention is to provide a sensing game apparatus having an actual game tool or the analogously formed game tool, to input an acceleration-correlated signal so that a game scene displayed on the monitor is changed on the basis of that signal.

A sensing ball game apparatus according to the present invention is for playing a ball game by displaying at least a ball character on a screen of a television monitor, comprising: an input device to be moved in a three-dimensional space by a game player; signal output means incorporated in the input means to output an acceleration correlated signal according to an acceleration upon moving the input device in the three-dimensional space; and a game processor for receiving the acceleration-correlated signal and causing a change in the ball character displayed on the screen.

The input device is moved in the three-dimensional space by the game player. In the case of a bat input device or racket input device for example, the player holds and swings it. Meanwhile, in the case of a ball input device, the game player makes a pitching action while holding it in the hand. The input device is provided with an acceleration sensor utilizing, for example, a piezoelectric buzzer. When the input device is moved, the acceleration sensor outputs an acceleration-correlated signal. The acceleration-correlated signal is transmitted to the game processor through a wire or wirelessly.

The game processor determines a moving speed of the input device on the basis of the acceleration-correlated signal, and computes parameters for a moving speed, direction and the like of a hit back ball on the basis of the computed speed, timing, ball course or the like. The ball is moved in the game scene according to the computed parameters.

According to the invention, the ball game can be played while displaying a game scene on the television monitor. Accordingly, the game can be readily enjoyed as in the television game. Moreover, because the game player actually moves the input device in the three-dimensional space to cause any change in the ball on the screen, it is possible to provide the game player with a realistic feeling of playing an actual ball game.

The above described objects and other objects, features, aspects and advantages of the present invention will become more apparent from the following detailed description of the present invention when taken in conjunction with the accompanying drawings.

BEST MODE FOR CARRYING OUT THE INVENTION

Figure 1:
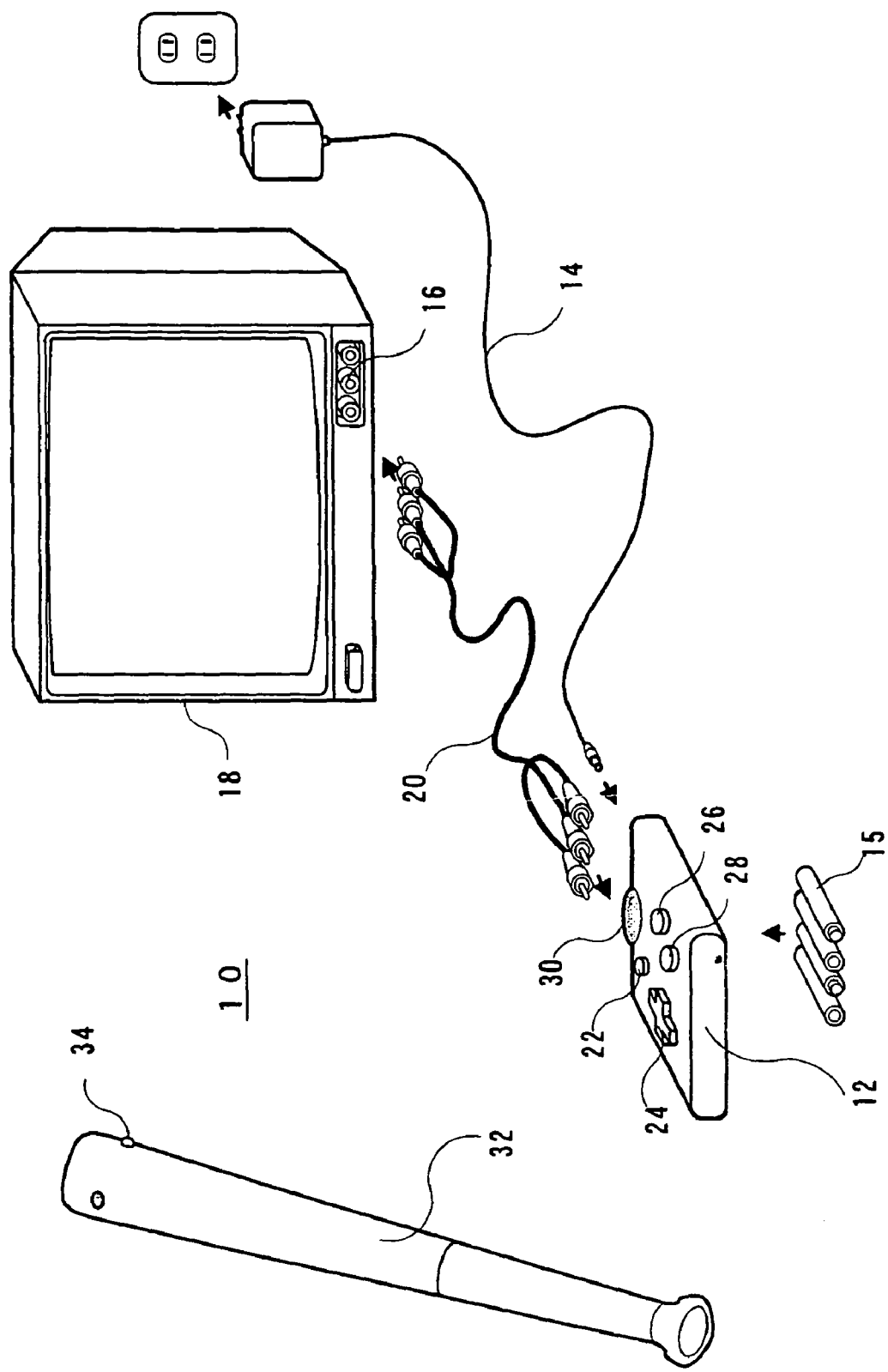
FIG. 1 is an illustrative view showing an overall structure of a sensing baseball game apparatus according to an embodiment of the present invention.

A sensing baseball game apparatus 10 as an example of the present invention shown in FIG. 1 includes a game machine 12. This game machine 12 is supplied with a direct current power through an AC/DC adapter 14. This, however, may be replaced with a battery 15. The game machine 12 is further connected to an AV terminal 16 of a television monitor 18 through an AV cable 20. The game machine 12 includes a housing having, thereon, a power switch 22 and three operation keys 24, 26 and 28. The direction key 24, e.g. a cross key, is used, for example, to instruct a direction of a game character on a display screen of the television monitor 18 or move a cursor for menu selection. The decision key 26 is used to determine an input to the game machine 12 while the cancel key 28 is used to cancel an input to the game machine 12. The game machine 12 is furthermore provided with an infrared-ray receiver 30. The infrared-ray receiving part 30 is to receive an infrared-ray signal from an infrared-ray LED 42 on the bat input device 32.

The bat input device 32 is formed, for example, of plastic, and has a shape, size or weight analogous to a bat for use in actual baseball. This device is to be moved in the three-dimensional space by game player's actual swing. To play a sensing baseball game of this embodiment, the game player holds the bat input device 32 at a grip part and swings the bat input device 32 just like in actual baseball. By detecting an acceleration or rotation speed of the bat input device 32 at that time, the game machine 12 causes a change in a game image being displayed on the television monitor 18.

It is noted that the shape, size or weight of the bat input device 32 may be desirably modified for safety in consideration of it as a toy. However, the bat input device 32 has an interior made hollow in at least one part thereof, to incorporate therein an acceleration switch, an acceleration sensor, etc. hereinafter referred.

Figure 2:
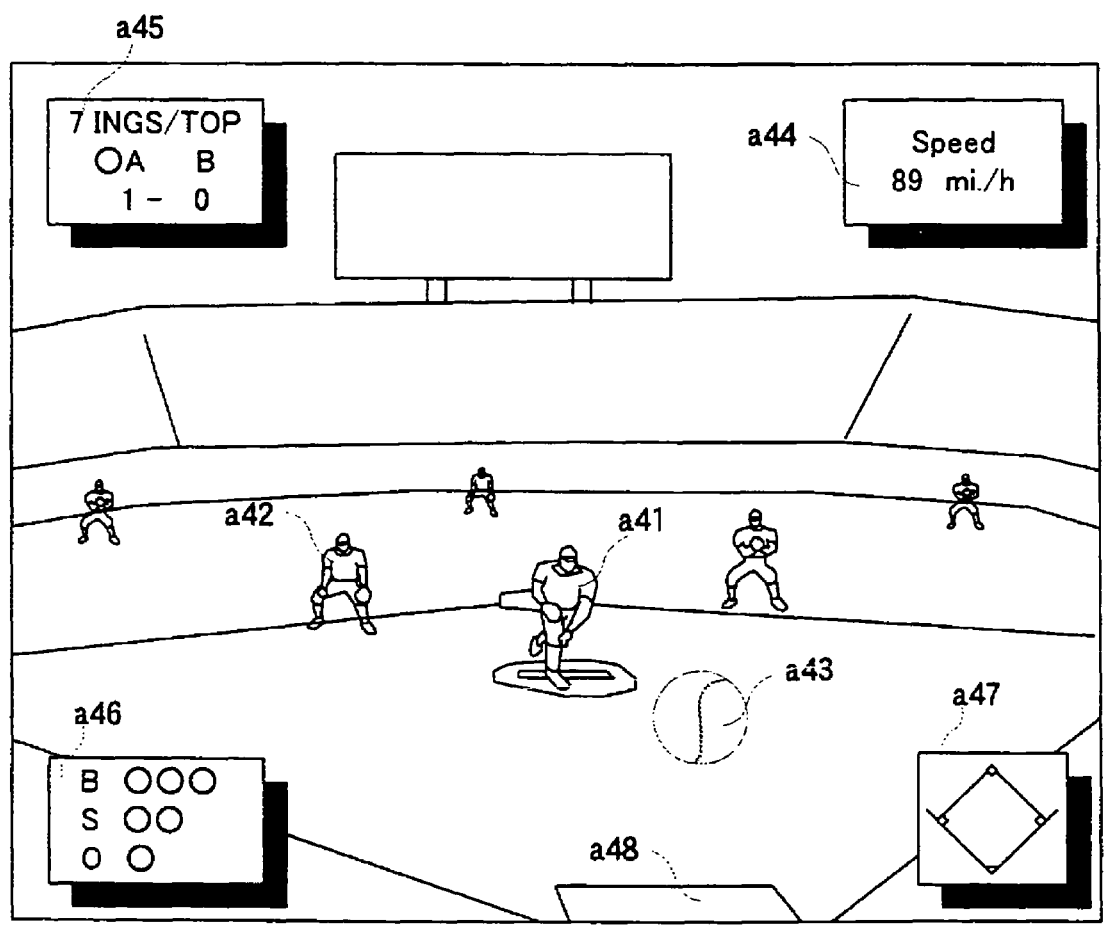
FIG. 2 is an illustrative view showing an example of a game screen displayed on a television monitor in the FIG. 1 embodiment.

In the sensing baseball game apparatus 10 of FIG. 1, a game scene for example shown in FIG. 2 is displayed on a screen of the television monitor 18. The game screen includes a still image (text screen) showing a baseball ground displaying therein a pitcher character a41 and other athlete characters a42. The pitcher character a41 at least is displayed as a moving-image character (sprite). Instead, all the athlete characters on the screen may be displayed as sprite images.

In the game screen, a pitcher character a41 pitches a ball character (hereinafter, may be referred to merely as "ball") a43 toward a home base character a48. The ball a43 is also a sprite image that moves toward the home base character a48 in accordance with a pitch action by the pitcher a41. The game player swings the bat input device 32 (FIG. 1) in a manner of hitting the ball a43. Note that the home base character a48 is displayed as a text screen.

In the game machine 12, when the player actually swings the bat input device 32, a signal from the acceleration switch or acceleration sensor (hereinafter referred) is transmitted as an infrared-ray signal from the infrared-ray LED 34 to the infrared-ray receiver 30. The ball a43 is moved toward the pitcher a41 or another athlete a42 as if the ball a 43 was hit back by the bat, according to timing the bat input device 32 reaches a predetermined moving speed and a position of the ball a43 on the screen. It is discriminated, according to a position where the ball a43 has moved to, whether gained is a hit (home run, three-base hit, two-base hit, one-base hit), foul, fly ball, grounder, out, safe or the like. However, where there is a deviation between the position of the bat when the bat input device 32 is swung and the position of the ball a43 on the screen, a missed swing for example is recognized.

As can be understood from a reference to FIG. 2, on the game screen, a ball speed display part a44, score display part a45, count display part a46 and runner display part a47 are further provided as required. The ball speed display part a44 is to display a speed of the ball a43 pitched by the pitcher character a41. This, however, displays a ball speed in accordance with a moving speed of a ball input device 64 (FIG. 9) pitched by the game player, in another embodiment hereinafter described. The score display part a45 displays game score in what innings in top or bottom. The count display part a46 is to display strike count, ball count and out count. The runner display part a47 is to display the runners now being on the bases.

Figure 3:
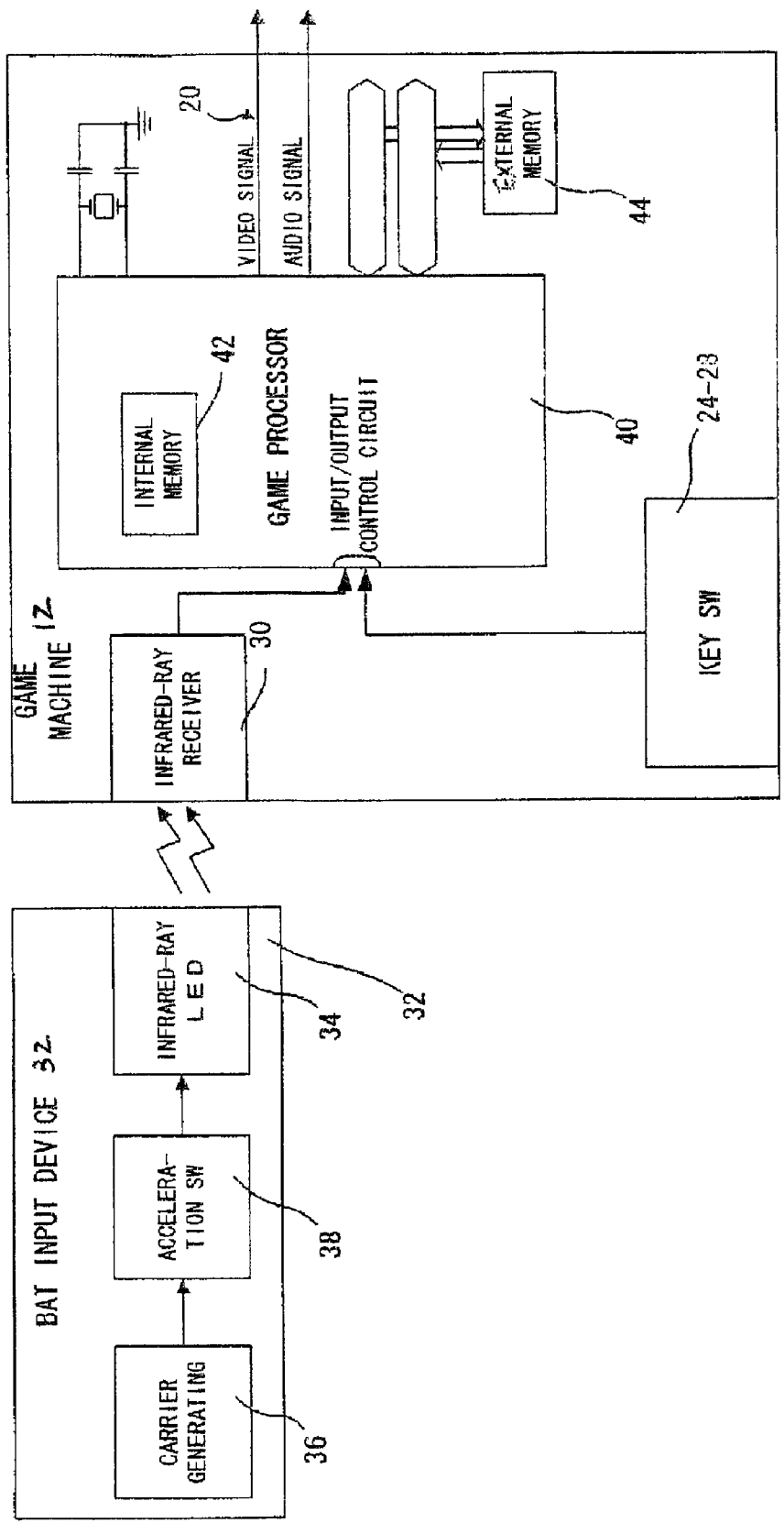
FIG. 3 is a block diagram showing the FIG. 1 embodiment.

FIG. 3 is a block diagram of the sensing baseball game apparatus 10 of FIG. 1. On the bat input device 32, the carrier (carrier wave) generated from a carrier generating circuit 36 is gated by an acceleration switch 38. Consequently, when the acceleration upon swinging the bat input device 32 is greater than a predetermined level, a carrier is supplied to the infrared-ray LED 34 to drive the same. The acceleration switch 38 may use a type which is turned on to output a signal when the acceleration of the bat input device 32 becomes greater than a certain level. For example, the acceleration switch may accommodate a weight for displacement within a cylindrical housing wherein the weight is elastically biased by a spring. When the input device is swung, a centrifugal force acts upon and displaces the weight against the spring, turning on the switch. In this case, by properly providing an elastic force to the spring, it is possible to properly set whether to output an on signal at what degree of an acceleration applied.

An infrared-ray receiver 30 is provided on the game machine 12 to receive an infrared-ray signal from the infrared-ray LED 34. The infrared-ray light receiver 30 demodulates a received infrared-ray signal and inputs it as an acceleration-correlated signal to the game processor 40.

Although the game processor 40 may use an arbitrary kind of processor, this embodiment uses a high-speed processor having been developed and already applied for a patent by the present applicant. This high-speed processor is concretely disclosed, for example, in Japanese Patent Laid-open No. 307790/1998 [G06F 13/36, 15/78] and the corresponding U.S. patent Ser. No. 09/019,277.

The game processor 40, although not shown, includes various processors such as a CPU, a graphic processor, a sound processor and a DMA processor. This also includes an A/D converter used in fetching analog signals, and an input/output control circuit to receive input signals such as key operation signal and infrared-ray signals and supplies output signals to an external apparatus. Consequently, the demodulation signal from the infrared-ray receiving part 30 and the input signal from the operation key 24-28 are delivered to the CPU through the input/output control circuit. The CPU executes a required operation according to an input signal and supplies a result thereof to other processors. Accordingly, the graphic processor and sound processor execute an image process and sound process in accordance with the operation result.

The game processor 40 is provided with an internal memory 42. The internal memory 42 includes a ROM or RAM (SRAM and/or DRAM). The RAM is utilized as a in temporary memory, a working memory or a register area and a flag area. Incidentally, an external memory (ROM and/or RAM) is connected to the game processor 40 through an external bus. The external memory 44 is previously set up with a game program. The internal memory 42 and the external memory 44 are computer-readable storage mediums.

The game processor 40 executes, utilizing the above processors, operation and graphic and sound processes according to an input signal from the infrared-ray receiver 30 and operation key 24-28, and outputs video and audio signals. The video signal is a combination of a text screen shown in FIG. 2 and a sprite image. These video and audio signals are supplied to the television monitor 18 through the AV cable 20 and AV terminal 16. Consequently, a game image is displayed together with required sound (sound effect, game music) as shown in FIG. 2 on a screen of the television monitor 18.

Figure 4:
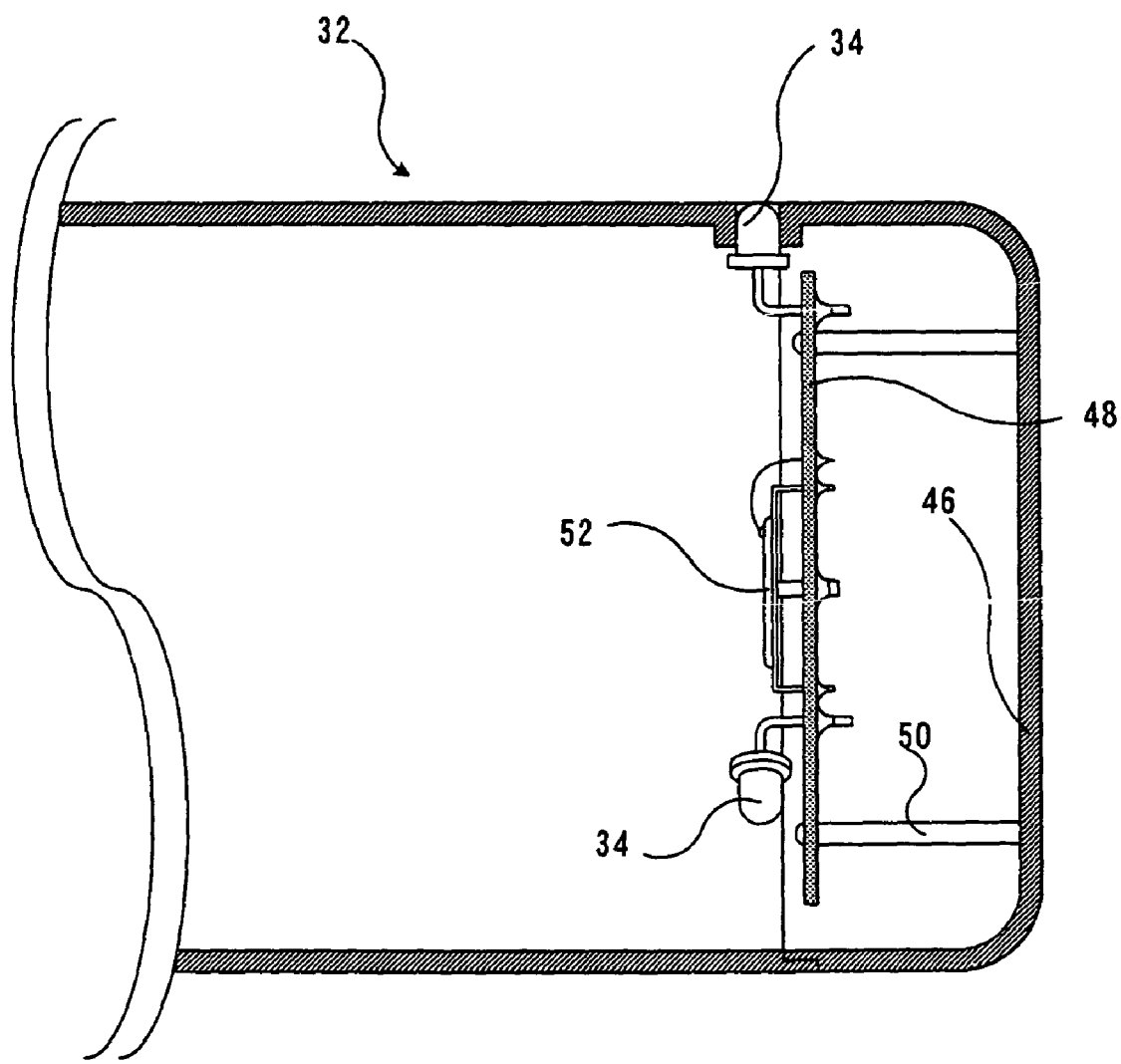
FIG. 4 is an illustrative view showing an interior structure of a tip part of a bat input device in the FIG. 1 embodiment.
Figure 5:
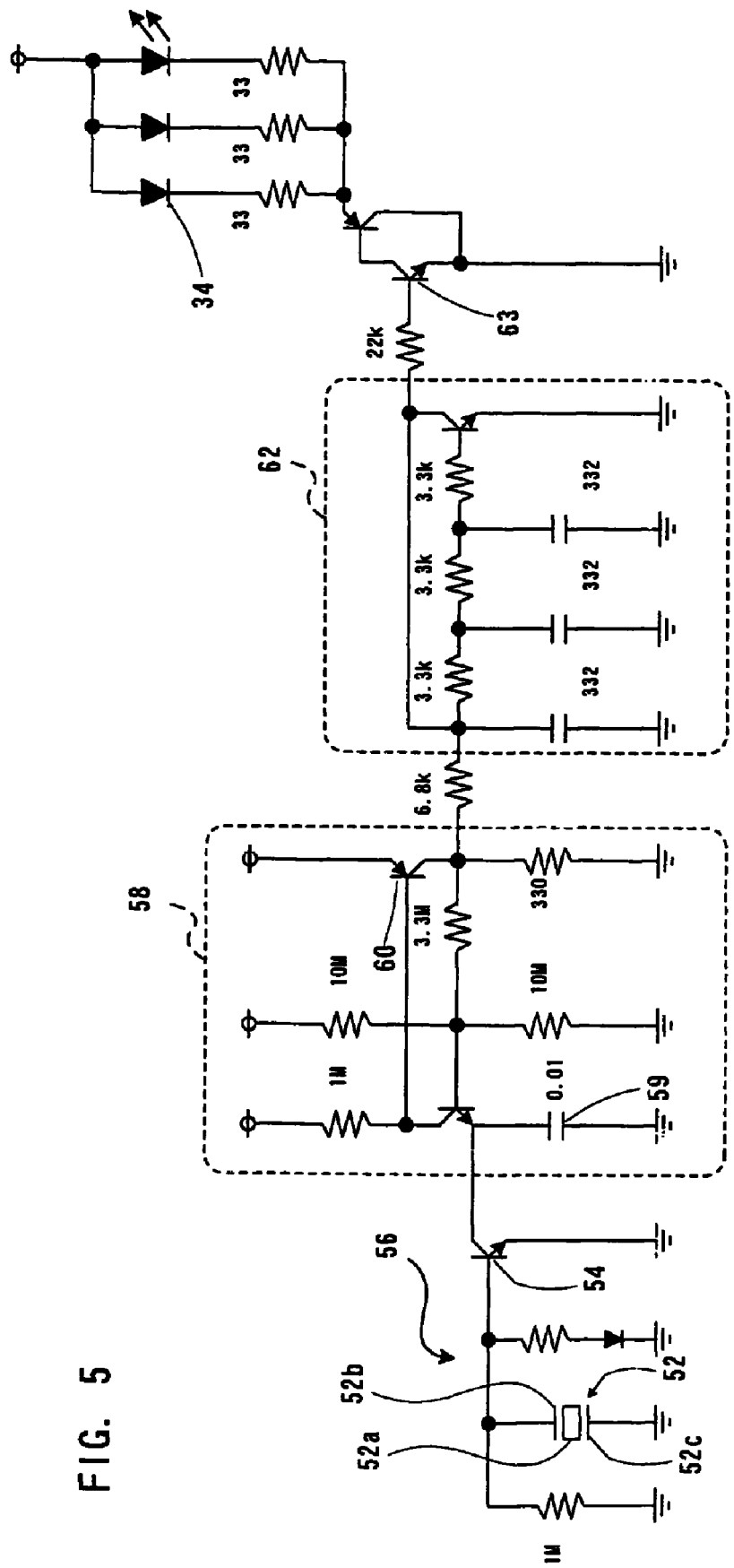
FIG. 5 is a circuit diagram of the bat input device.
Figure 6:
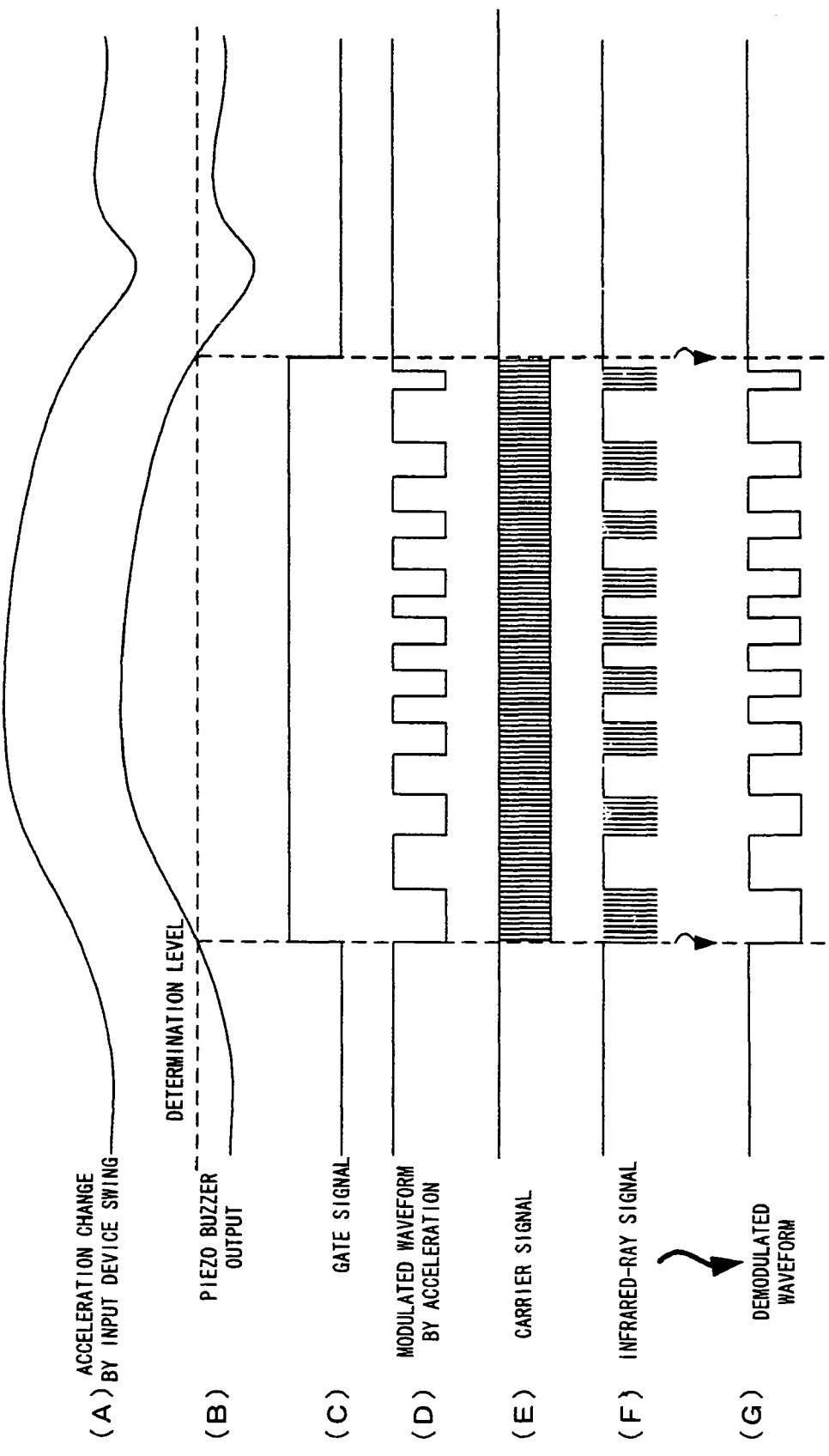
FIG. 6 is a waveform diagram of various parts showing operation of the bat input device.

With reference to FIG. 4 to FIG. 6, explanation is concretely made on the bat input device 32 as one feature of this embodiment. FIG. 4 shows a tip portion of the bat input device 32 together with its interior structure. In the interior of the tip of the bat input device 32, a printed circuit board 48 is fixedly attached parallel in plane with a tip surface 46 by a boss 50 vertically standing from an inner surface of the tip surface 46. The printed circuit board 48 has a piezoelectric buzzer 52 mounted in one surface, and on the other surface an interconnect pattern constituting an electric circuit shown in FIG. 5 including the piezoelectric buzzer 52. The infrared-ray LED 34 is mounted on the printed circuit board 48 and placed facing to a light transmission part formed in a tip-periphery side surface of the bat input device 32. Accordingly, the infrared-ray signal from the infrared-ray LED 34 is outputted through the light transmission part and then received by the infrared-ray receiving part 30 provided on the game machine 12, as was explained before.

The piezoelectric buzzer 52 is a piezoelectric ceramic plate 52 formed, for example, barium titanate or PZT having electrodes 52*b* and 52*c* respectively formed on the both main surfaces thereof, as well known or as shown in FIG. 5. This embodiment utilizes a piezoelectric buzzer 52 as an acceleration sensor. That is, in this embodiment the acceleration-correlated signal generating means utilizes an acceleration sensor in place of the acceleration switch explained before with reference to FIG. 3.

More specifically, the piezoelectric buzzer 52 is attached parallel, in plane, with the tip surface 46 of the bat input device 32. When the bat input device 32 is swung by the game player, the tip is acted upon by a strongest centrifugal force. Consequently, the piezoelectric plate 52*a* of piezoelectric buzzer 52 is deformed by the centrifugal force, causing a potential difference between the opposite main surfaces of the piezoelectric plate 52*a* proportionally to the deformation. The potential difference varies depending upon a stress (centrifugal force) received by the piezoelectric plate 52*a*. If the stress is great, the strain, or potential difference, is great while if the stress is small, the strain, or potential difference, is small. In other words, the potential difference caused on the piezoelectric buzzer 52 varies depending upon a speed or intensity of swing of the bat input device 32 by the player. Accordingly, it is possible for this embodiment to utilize the piezoelectric buzzer 52 as an acceleration sensor.

The potential difference caused on the piezoelectric buzzer 52 is provided to a base of a transistor 54. Consequently, the transistor 54 conducts at a conductivity in accordance with a magnitude of the potential difference. Those of the piezoelectric buzzer 52 shown at a left in FIG. 5, the accompanying circuit elements and the transistor 54 are referred to as an acceleration sensor 56.

The collector output of the transistor 54 is inputted to a modulation pulse generating circuit 58. The modulation pulse generating circuit 58 includes a capacitor 59. The capacitor 59 is charged with electric charges in amount corresponding to the conductivity of the transistor 54. That is, because the transistor 54 and capacitor 59 form a common current route, the conductivity of the transistor 54 when great increases the current flowing through the transistor 54 and decreasing the charge current flowing to the capacity 59. Conversely when the conductivity of the transistor 54 is small, the current flowing through the transistor 54 decreases and the charge current flowing in the capacitor 59 increases. The charge voltage on the capacitor 59 is discriminated in level by a transistor 60. Consequently, the transistor 60 at an emitter outputs a pulse having a pulse width depending upon a magnitude of the charge voltage to the capacity 59.

The modulation pulse from the modulation pulse generating circuit 58 is applied to a carrier generating circuit 62. The carrier generating circuit 62 generates predetermined frequency of a carrier (carrier wave). Consequently, the carrier generating circuit 62 has an output as a signal having the carrier modulated by a modulation pulse. The modulated signal acts to operate a switching transistor 63. In response, the infrared-ray LED 34 flickers according to the modulated signal, and the infrared-ray LED 34 outputs an infrared-ray signal in accordance with that signal.

It is assumed with reference to FIG. 6 at the bat input device has an acceleration varying as shown in FIG. 6(A). Following the acceleration change, a voltage signal as shown in FIG. 6(B) is outputted from the piezoelectric buzzer 52. When the voltage signal exceeds a determination level as determined by the transistor 54, the transistor 54 is placed in conduction, i.e. gate is opened. As was explained before, a modulation pulse having a pulse width nearly in reverse proportional to a magnitude of the acceleration, or a voltage signal from the piezoelectric buzzer 52, is outputted from the modulation pulse generating circuit 58, as shown in FIG. 6(C). Although the carrier generating circuit 62 generates a carrier as shown in FIG. 6(D), the carrier is modulated by the modulation pulse. Accordingly, an infrared-ray signal as shown in FIG. 6(F) is outputted from the infrared-ray LED 34.

The infrared-ray receiver 30 (FIG. 3) provided on the game machine 12 receives such an infrared-ray signal and demodulate it to obtain a modulated signal as shown in FIG. 6(G). This demodulated signal is inputted to the game processor 40 through the input/output control circuit (not shown). Consequently, the game processor 40 calculates a speed of a swing of the bat input device 32 by the game player, i.e. a rotation speed of the bat input device 30, on the basis of the demodulated signal of FIG. 6(G).

Figure 7:
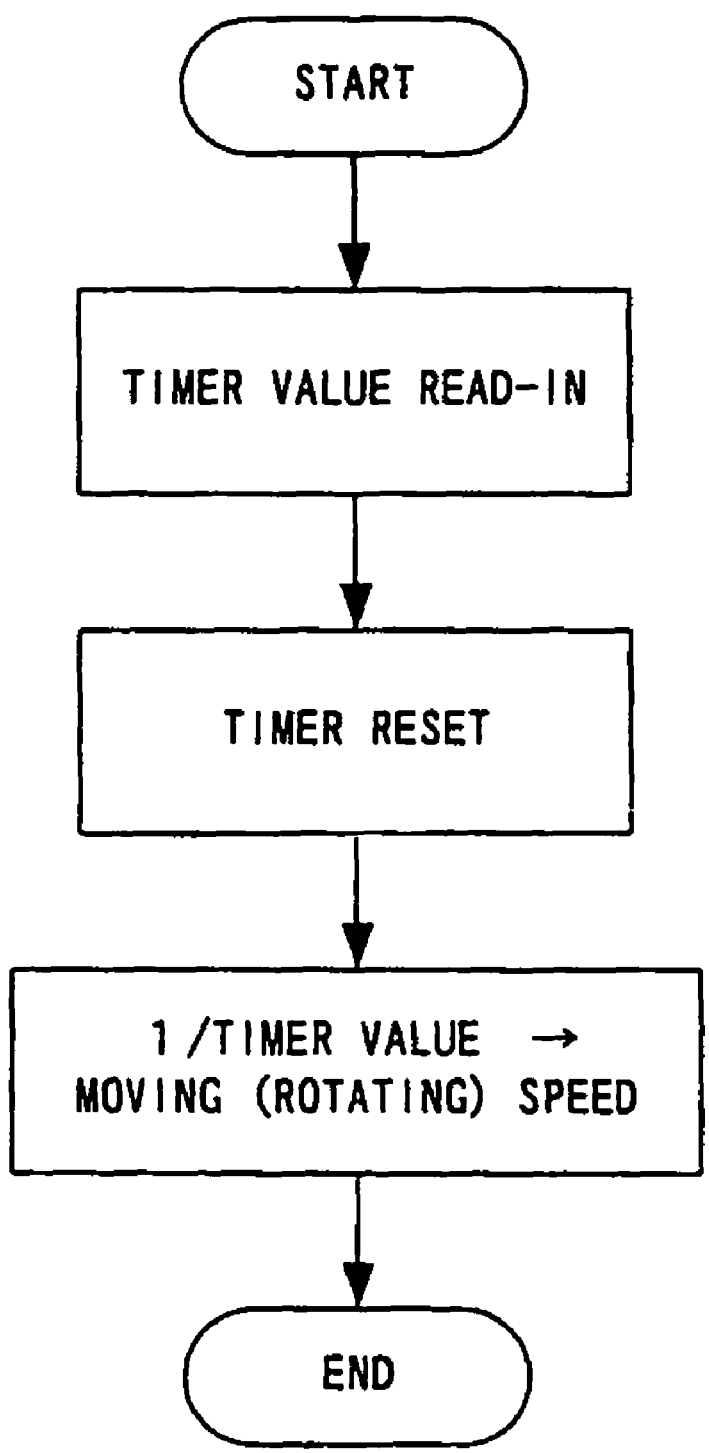
FIG. 7 is a flowchart showing an operation that the game machine, or game processor, takes in a rotation speed of the bat input device in the FIG. 1 embodiment.

FIG. 7 is a flowchart for calculating a rotation speed. This flowchart shows an interrupt operation to be executed each time a front edge of a demodulated signal comes as shown in FIG. 6(G). When a demodulated signal front edge is detected, the CPU (not shown) included in the game processor 40 reads in a count value (timer value) of a not-shown timer circuit. Next, the CPU resets the timer circuit in response to a demodulated signal rear edge. Consequently, the CPU knows a timer value between the front and rear edges of a demodulated signal pulse. Accordingly, a reciprocal of the timer value (1/timer value) is determined as a moving or rotation speed of the at input device 32.

The moving or rotation speed of the bat input device 32 thus determined is reflected in the movement of a batted ball, thereby causing a change in a distance or direction of the ball a43 (FIG. 2) in accordance with a swing speed of the bat input device 32.

Figure 8:
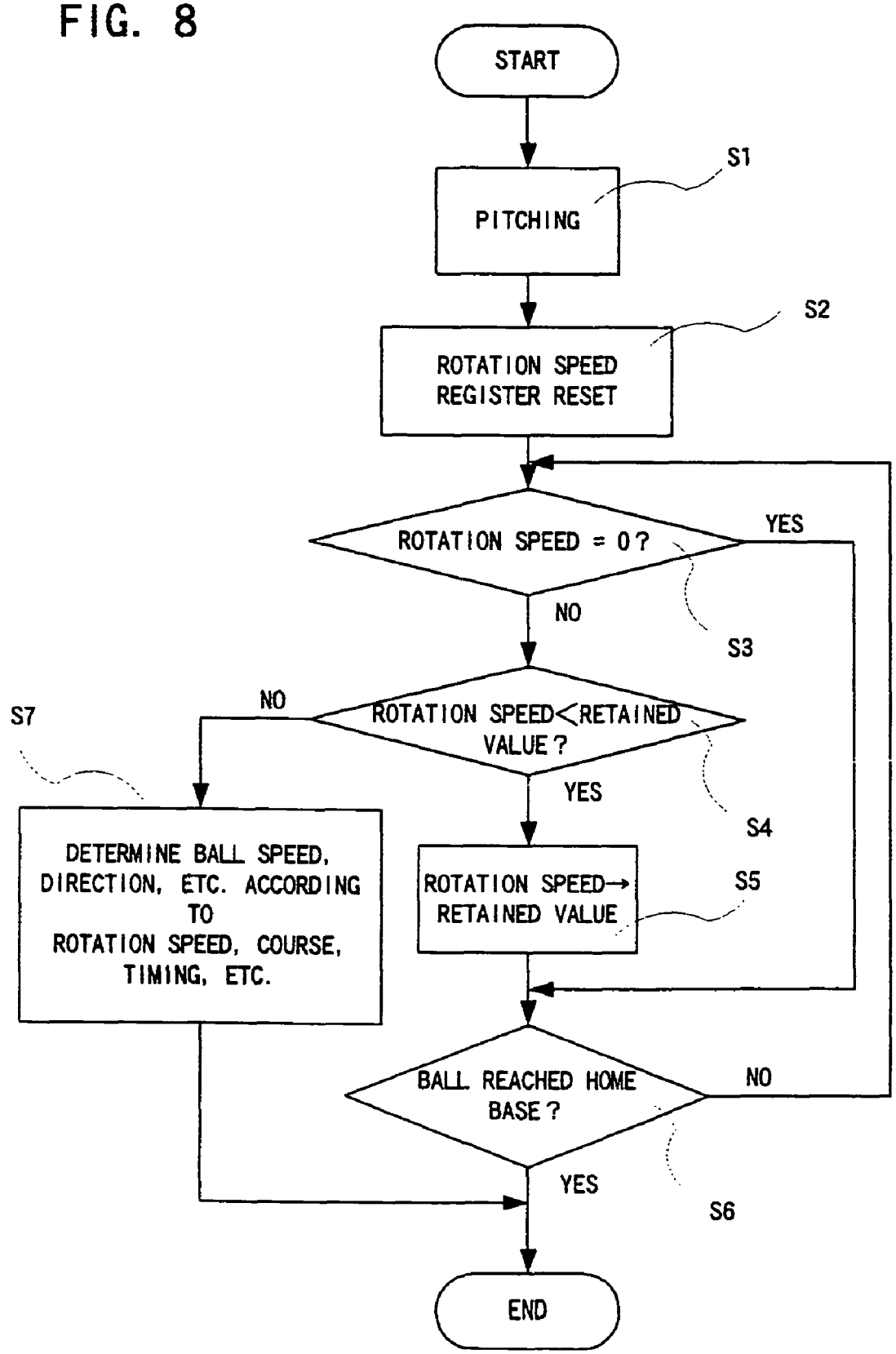
FIG. 8 is a flowchart showing an operation upon swinging of the bat input device in the FIG. 1 embodiment.

Referring to FIG. 8, in the first step S1 the game processor 40 (FIG. 3) causes a change in the shape of a pitcher character a41 and the shape and position of a ball a43 such that, on the screen, the pitcher character a41 makes pitching to move the ball in accordance therewith. At this time, because the game processor 40 naturally displays a text screen as well, a game scene shown in FIG. 2 is displayed on the television monitor 18. Such a game image is generated by the graphic processor included in the game processor 40.

In the next step S2, the game processor 40 resets the rotation speed value retained in a rotation speed register (not shown) formed in the internal memory 42 (FIG. 3).

Thereafter, the game processor 40 in step S3 takes in a rotation speed determined as in FIG. 7 and determines whether the taken rotation speed is "0" or not, i.e. whether the game player has swung the bat input device 32 or not. If the game player has swung the bat input device 32, the rotation speed is not "0" and the process proceeds to the next step S4. When the rotation speed is "0", the process proceeds to step S6.

In the step S4, the game processor 40 determines whether the rotation speed taken in the step S3 is smaller than the value retained in the rotation speed register (rotation speed<retained value) or not. In the beginning of swing the bat input device 32, the rotation speed is low as can be understood from FIG. 6(A). The speed gradually increases with the progress of swing. Accordingly, in the step S4, "No" is determined. Consequently, game processor 40 replaces the retained value of the rotation speed register with the rotation speed at that time. That is, the retained value of the rotation speed register is updated.

As the swing of the bat input device 32 proceeds, the rotation speed soon reaches a peak and then gradually decreases. It can be determined in the step S4 whether the rotation speed of the bat input device 32 has reached a peak or not.

The game processor 40 then determines whether the ball 43 has reached a catcher position, i.e. a home base a48 position, on the game screen or not. This can be determined by detecting whether the ball 43 in a depth position of the game screen (to be known by the CPU) has moved to a position assumed as a home base a48 or not. In this case, however, there is a need to take into consideration a speed of the ball a43 (displayed in the speed indicating area a44 in FIG. 2).

The fact "YES" has not been determined in step S4 before reaching the ball a43 to the catcher position means that a peak of the rotation speed has not detected in the duration between pitching of the ball a43 by the pitcher a41 and reaching the ball a43 to the catcher position. In other words, this means a disagreement between the timing of swinging the bat input device 32 by the game player and the timing of moving the ball a43, i.e. swing has been made after catching of the ball a43 by the catcher. In this case, game processor 40 determines as "missed swing". However, where the rotation speed remains "0" in the step S3, it means that the bat input device 32 has not been swung. In this case, the game processor 40 determines as to strike or ball depending upon a ball a43 reach position and established strike zone.

The steps S3-S5 are repeatedly executed at a proper time interval until the ball a43 reaches the catcher position. In this course, if "YES" is determined in the step S4, it means that the rotation speed due to swing of the bat input device 32 reaches a peak. In this case, the game processor 40 in step S7 determines parameters of moving speed, direction, etc. in a reverse direction of the ball a43 hit back by the bat, or batted ball a43, according to a rotation speed, ball a43 position (pitched-ball course), timing, etc. The ball a43 is moved according to the parameters thus determined. As a result, the game processor, for operating section, executes determinations of hit or foul as explained before and determination of out or safe and the like.

According to the FIG. 1 embodiment, when the game player swings the bat input device 32 to a ball movement on the game screen, a rotation speed of the input device 32 is detected. In accordance with the speed and timing, the ball is batted. Thus, the ball moves as a batted ball in the game scene. In compliance with a position the batted ball reaches, determined is out or safe just like in the usual baseball game. Accordingly, in this embodiment, the game player facing the screen of the television monitor 18 may swing the bat input device 32. This provides enjoyment of a reality feeling that could not have been experienced in the conventional television game. Moreover, the game player may satisfactorily swing the bat input device 32 while readily enjoying the game.

Incidentally, in the above explanation the acceleration sensor 56 (FIG. 5) was incorporated within the bat input device 32 whereby a signal varying in pulse width is outputted responsive to an acceleration from the sensor and, in the step S4, a peak is detected of a moving speed or rotation speed of the bat input device 32. However, where using the acceleration switch 38 of the type explained before with reference to FIG. 3, it is satisfactory to determine, in place of the step S4, whether or not a signal has been outputted from the acceleration switch. In this case, it is natural to omit the process concerning the rotation-speed retained value as in the step S2 and S5. That is, when using the acceleration switch, a direction and distance of a batted ball is determined according to timing the acceleration switch 38 (FIG. 3) turns on and ball a43 position.

Figure 9:
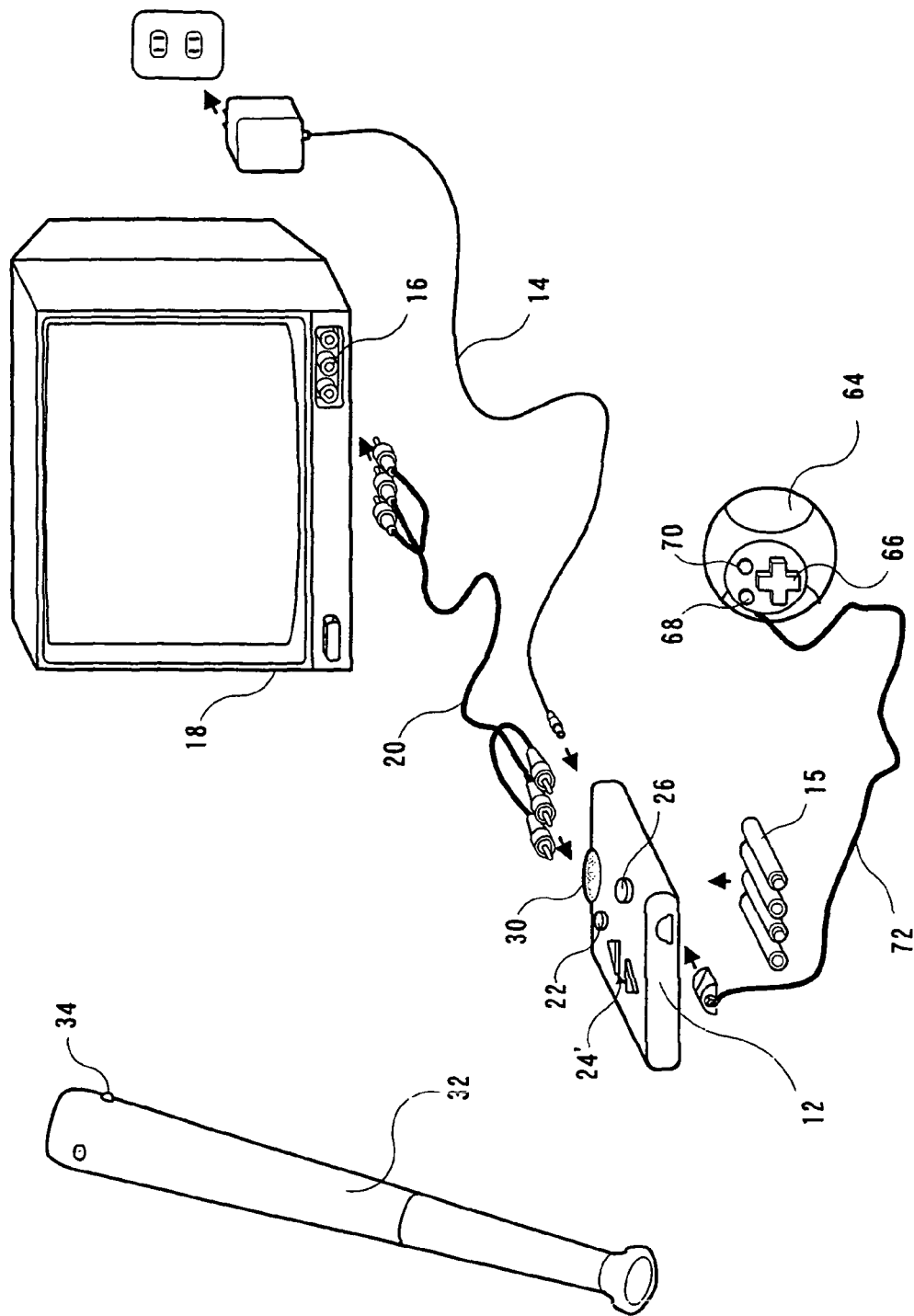
FIG. 9 is a modification to the FIG. 1 embodiment, as an illustrative view showing a competition-type sensing baseball game apparatus.

FIG. 9 is a modification to the FIG. 1 embodiment. This modification uses a ball input device 64. When playing a sensing baseball game in this embodiment, the game player holding the ball input device 64 in the hand makes a pitching action (imitative pitching), to move the ball input device 64 in the three-dimensional space. The ball input device 64 is provided with a direction switch 66. The direction switch 66 is to determine a ball course, e.g. straight ball, curve ball, shoot or the like. At a start of pitching action, one of direction instructing portions is turned on or none of the direction instructing portions are turned on. Furthermore, the ball input device 64 includes two switches 68 and 70. The switch 68 is to instruct a start of a pitching action. The ball input device 64 is connected to the game machine 12 through an input line 72. Consequently, the game machine 12 is inputted by a signal from an acceleration sensor 56 built-in the ball input device 64, similarly to the bat input device 32. That is, a voltage signal is caused due to a movement of the ball input device 64 in the three-dimensional space by the acceleration sensor 56 according to an acceleration, and delivered through the input line 72 to the game processor 40. The game processor 40 determines a moving speed from the acceleration, to displace or move the ball a43 (FIG. 2) pitched in the game scene on the television monitor 18, according to the moving speed.

Figure 10:
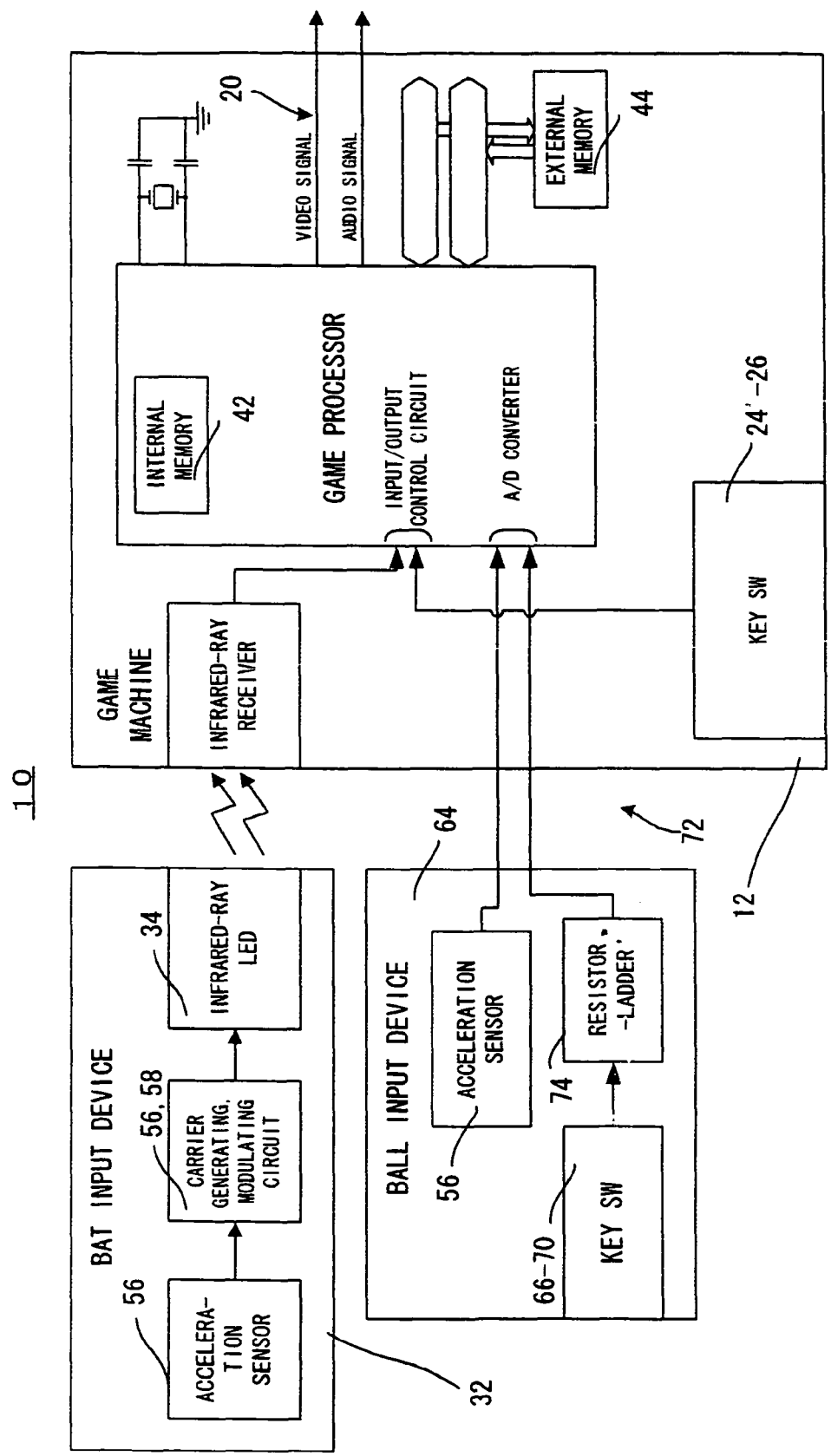
FIG. 10 is a block diagram showing the FIG. 9 embodiment.

FIG. 10 is a block diagram showing this embodiment, which is different from the FIG. 3 block diagram in the following point. That is, the ball input device 64 is connected to an A/D converter input of the game processor 40 by the input line 72. The input line 72, naturally, has a sufficient length for the game player to hold the ball input device 64 in the hand and make a pitching action (imitative pitching). Three input switches 66-70 provided on the ball input device 64 are connected to a resistor-ladder circuit 74. The resistor-ladder circuit 74 outputs a distinctive voltage signal, according to an operation of the switch 66-70. The resistor-ladder circuit 74 inputs a voltage signal to the game processor 40 through the A/D converter. Consequently, the game processor 40 is allowed to determine a switch or direction instructing part operated at that time by the game player, according to a voltage from the A/D converter.

The ball input device 64 further possesses an acceleration sensor 56. The acceleration sensor 56 includes six piezoelectric buzzers 52x1, 52x2, 52y1, 52y2, 54z1 and 52z2 in order to independently detect an acceleration in each of three axial directions X, Y, and Z, as hereinafter explained with reference to FIG. 11. However, the piezoelectric buzzers 52x1, 52x2, 52y1, 52y2, 52z1 and 52z2 are similar to the piezoelectric buzzer 52 of the bat input device 32 shown in FIG. 4 and FIG. 5. Also, each piezoelectric buzzer 52x1, 52x2, 52y1, 52y2, 52z1 and 52z2 has a separate piezoelectric buzzer 52 and accompanying electric circuit including the transistor 54. In this embodiment, however, the acceleration signal (voltage signal) from the acceleration sensor 56 is supplied to the A/D converter input of the game processor 40 through the input line 72. Accordingly, the output of the transistor 54 of FIG. 5 will be inputted, without change, to the A/D converter of the game processor 40.

Figure 11:
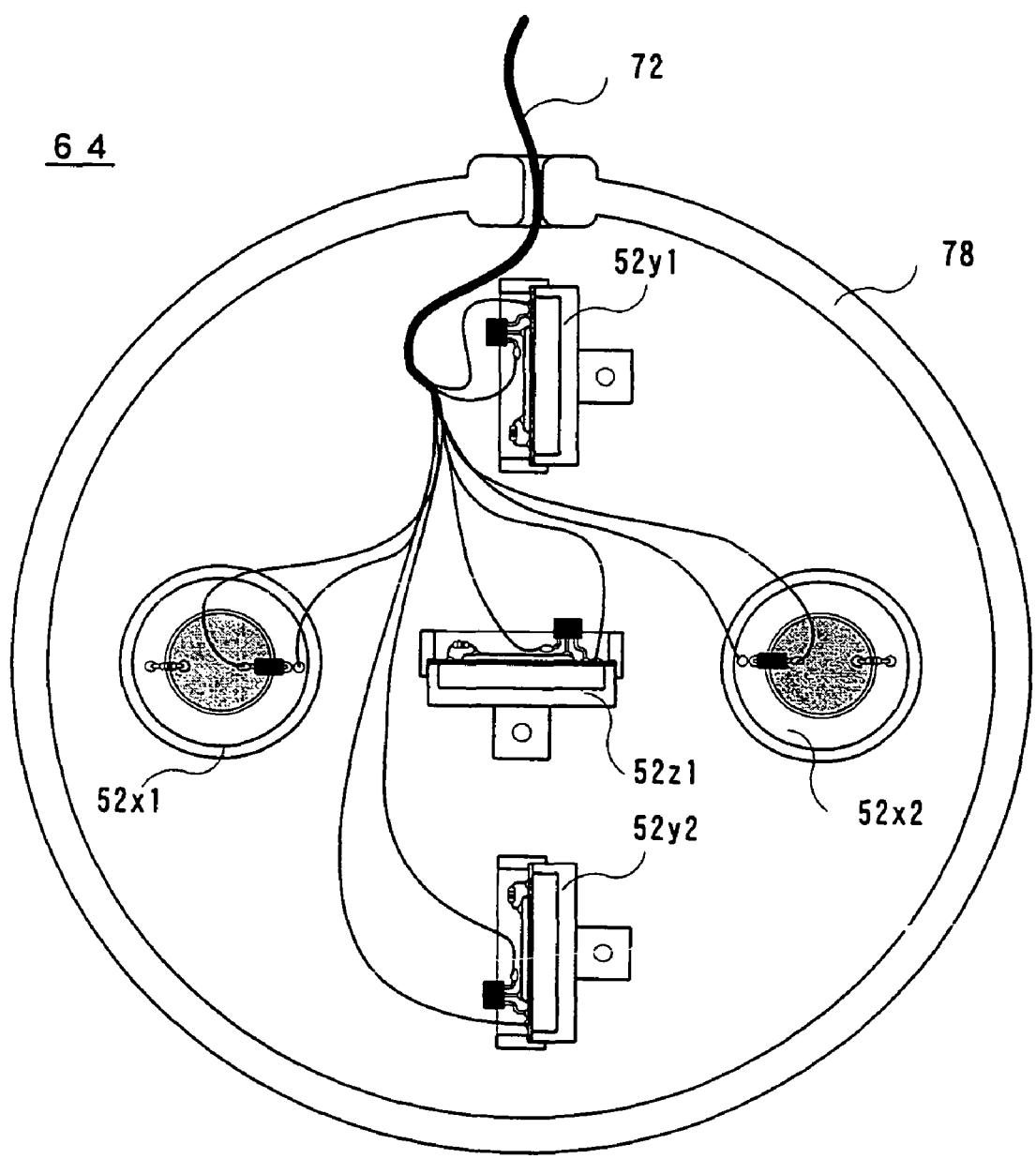
FIG. 11 is an illustrative view showing a ball input device, together with a structure thereof, in the FIG. 9 embodiment.

Referring to FIG. 11, the ball input device 64 has a housing 78 formed, for example, of plastic in a hollow-sphere form. Totally six piezoelectric buzzers, i.e. two per axis sandwiching the origin (center point of the ball input device), are fixedly provided, together with their accompanying circuits, within the housing 78. However, FIG. 11 shows only 52x1, 52x2, 52y1, 52y2 and 52z1 wherein it is impossible to show the piezoelectric buzzer 52z1 and the piezoelectric buzzer 52z2 provided opposite with respect to the origin.

Figure 12:
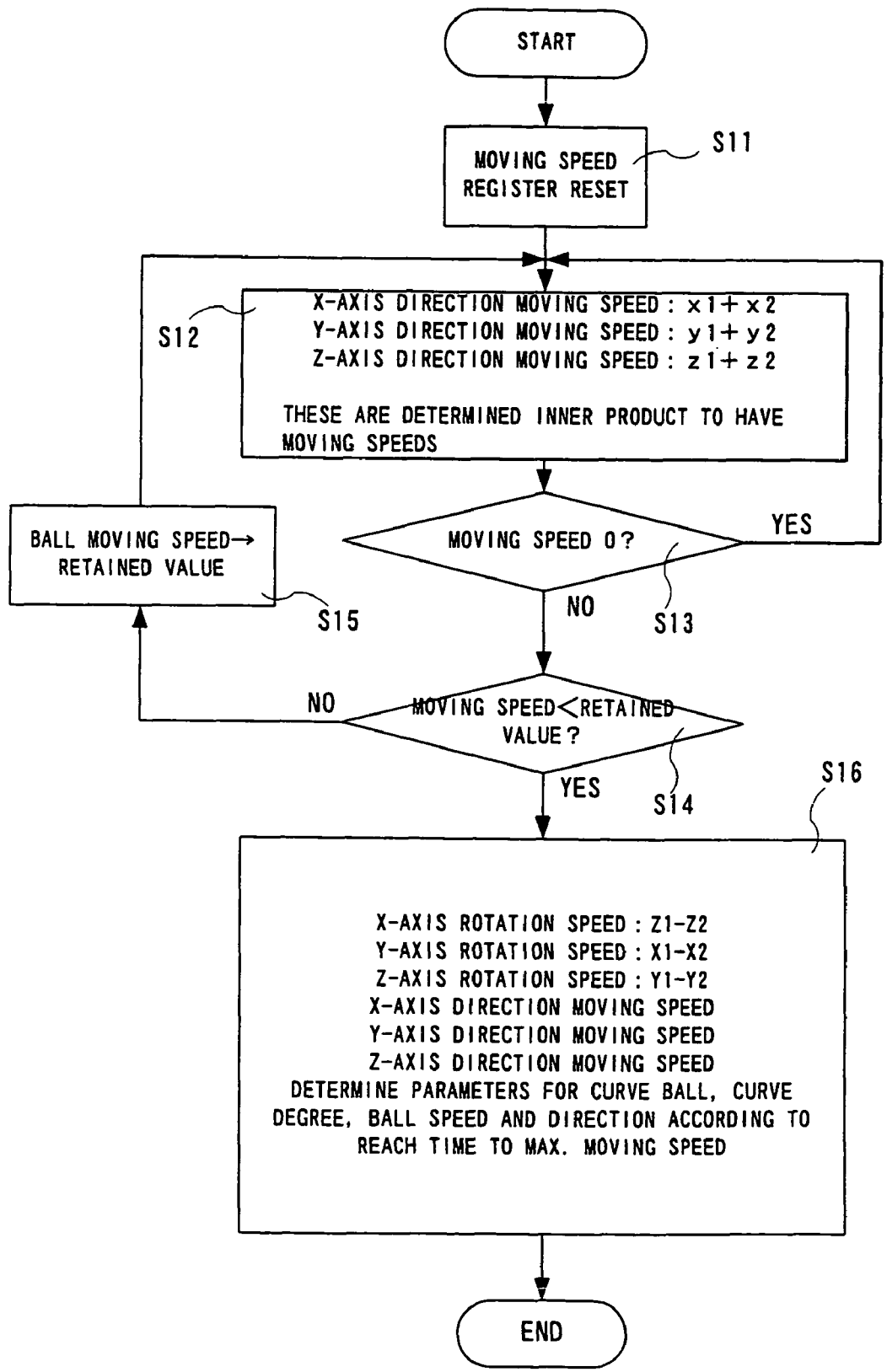
FIG. 12 is a flowchart showing an operation of pitching using the ball input device in the FIG. 9 embodiment.

A pitch determining routine of FIG. 12 is started when the game player turns on the input switch 68 of the ball input device 64. In the first step S11 of the routine, the game processor 40 initially sets a moving-speed register (not shown) formed in the internal memory 42. That is, the register is reset with a retaining value of a curtain moving speed.

In the next step S12, the game processor 40 determines moving speeds in X, Y, and Z axes directions, on the basis of the accelerations detected by the piezoelectric buzzers 52x1, 52x2, 52y1, 52y2, 52z1 and 52z2 provided two on each axis of the ball input device 64. Incidentally, in order to determine a speed from an acceleration, the acceleration may be integrated as well known. Herein, an X-axis-direction moving speed is determined as "x1+x2", a Y-axis direction moving speed as "y1+y2", and a Z-axis-direction moving speed as "z1+z2". Incidentally, x1, y1 and z1 as well as x2, y2 and z2 are, respectively, on-axis moving speeds on the plus and minus sides with respect to the origin. These are detected respectively by the piezoelectric buzzers 52x1, 52y1 and 52z1 as well as 52x2, 52y2 and 52z2. In the step S12, an inner product is determined from the moving speed on each axis thus determined, and rendered as a moving speed of the ball input device 64.

In step S13, it is determined whether the moving speed determined in the step S12 is "0" or not. That is, it is determined whether the game player has made an pitching action using the ball input device 64 or not. If "YES" is determined in the step S13, the process returns to the step S12.

When "NO" is determined in the step S13, i.e. when the moving speed of the ball input device 64 is not "0", the game processor 40 in step S14 determines whether the moving speed is smaller than the value retained in the moving-speed register (not shown) (moving speed>retained value) or not. In a pitch action using the ball input device 64, the moving speed usually is low in the beginning of pitch action and gradually increased. Consequently, the determination "NO" in the step S14 means the moving speed has not reached a peak. In this case, the retained value of the moving-speed register in this step S15 is updated with a moving speed at that time, and then the process returns to the step S12. The determination "YES" in the step S14 means that a peak of the moving speed has been detected. In this case, process proceeds to step S16.

In the step S16, the parameters of ball change degree, moving speed, moving direction, etc. are determined on the basis of each-axis rotation speed, each-axis moving speed, time to the moving-speed peak, etc.

More specifically, a rotation speed is determined on the basis of the moving speeds on each axis sandwiching the origin. For example, if there is a difference between the moving speeds z1 and z2 in the z-axis direction, it can be considered that the ball input device 64 is rotating about the x-axis. Similarly, if there is a difference between the moving speeds x1 and x2 in the x-axis direction, the ball input device 64 can be considered rotating about the y-axis. If there is a difference between moving speeds y1 and y2 in the y-axis direction, the ball input device 64 can be considered rotating about the z-axis. Consequently, an x-axis rotation speed is determined by "z1−z2", a y-axis rotation speed by "x1−x2", and a z-axis rotation speed by "y1−y2". Furthermore, the moving speeds in the axial directions are retained in the moving-speed register. Also, a peak-reaching time can be determined by making reference to count value of a timer provided in the game processor 40.

According to the parameters determined in the step S16, the game processor 40 moves the ball a43 as a sprite image in the game scene of the television monitor 18 (FIG. 9). It is needless to say that the real-time position of the ball a43 can be computed by integrating the moving speeds.

The use way and the operation accompanied therewith of the bat input device 32 in the FIG. 9 embodiment are similar to those of FIG. 1 embodiment. Accordingly, in the FIG. 9 embodiment, one game player is allowed to make a pitch action using the ball input device 64 while the other game player swings the bat input device 32, thereby enjoying a competition-type sensing baseball game.

Figure 13:
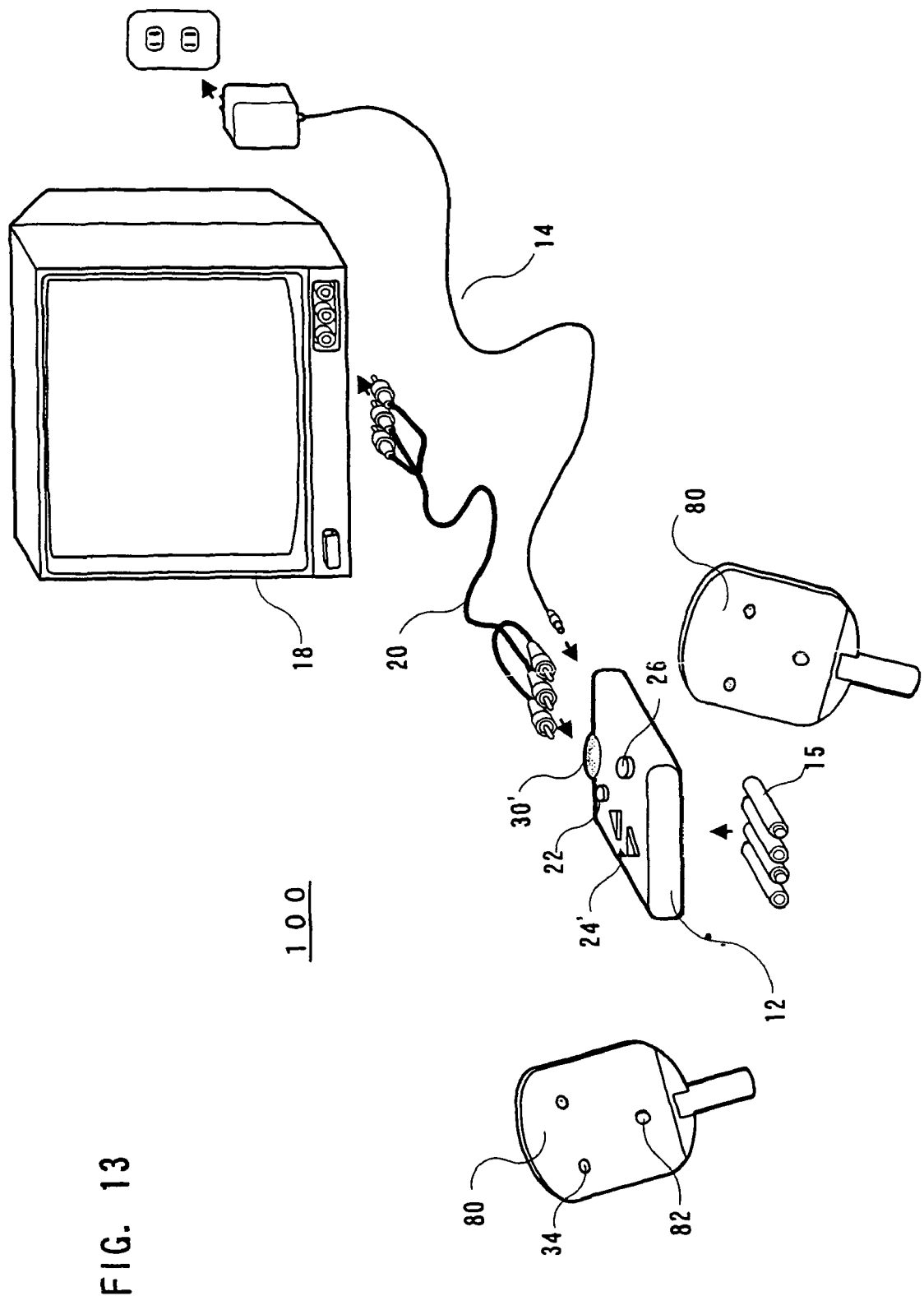
FIG. 13 is another embodiment of the invention, as an illustrative view showing a competition-type table-tennis game apparatus.

Referring to FIG. 13, a sensing table-tennis game apparatus 100 as another embodiment of the invention includes a game machine 12, a television monitor 18 and an AV cable 20 for connecting between them, similarly to the sensing baseball game apparatus 10 explained above. The game machine 12 is further provided with a power switch 22, a select key 24' and a decision key 26, and an infrared-ray receiver 30'. An external memory 44 is installed with a program for a sensing table-tennis game.

This embodiment uses two racket input devices 80. The racket input device 80 has an infrared-ray LED 34 and a serve switch 82. The switch 82 is operated when putting a serve ball. The infrared-ray signal from the infrared-ray LED 34 is received by the infrared-ray receiver 30' of the game machine 12. As explained later, the racket input device 80 has a piezoelectric buzzer or acceleration sensor, similarly to the foregoing input device 32 and 64. The game machine 12 receives an acceleration signal from the acceleration sensor, to cause a change in the ball a43 in the game scene shown in FIG. 14.

Figure 14:
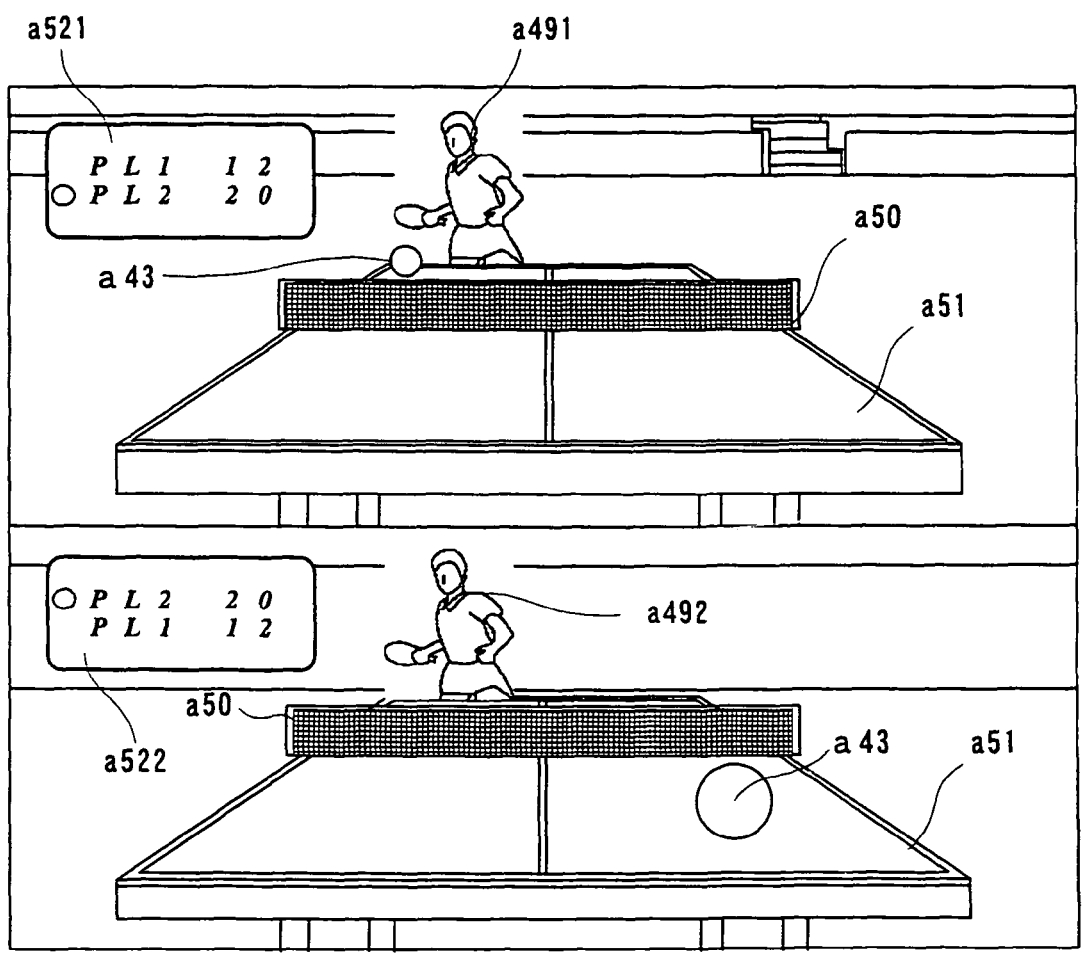
FIG. 14 is an illustrative view showing an example of a game screen displayed on the television monitor in the FIG. 13 embodiment.

Referring to FIG. 14, the game screen displayed on the television monitor 18 of the sensing table-tennis game apparatus 100, when in a competition-type game, is split into upper-and-lower two screen portions. The upper screen portion displays an image as viewed from one game player while the lower screen portion displays an image as viewed from the other game player. The upper and lower screens each display a ball a43 and athlete characters a491 and a492 as sprite images, and a net character a50 and a ping-pong table character a51 as text screen. Score indicator areas a521 and a522 are formed, respectively, on the upper and lower portions to indicate score of the relevant game players.

Figure 15:
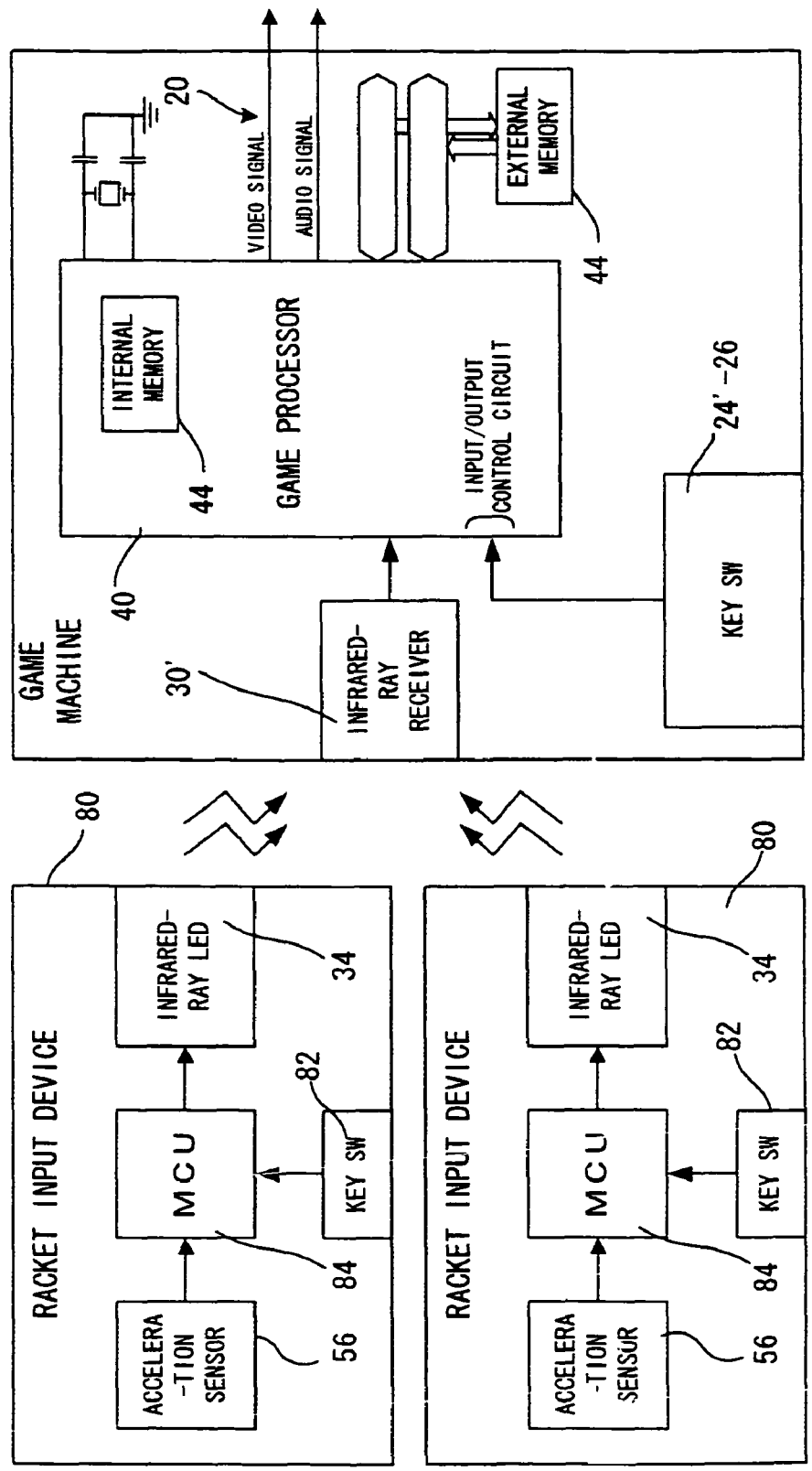
FIG. 15 is a block diagram showing the FIG. 13 embodiment.

Referring to FIG. 15, the racket input device 80 has an acceleration sensor 56 similar to that of the foregoing embodiment. The acceleration sensor 56 outputs an acceleration-correlated signal to an MCU 84. The MCU, e.g. single-chip microcontroller, converts the acceleration-correlated voltage signal inputted from the acceleration sensor into a digital signal and digital-modulates to be supplied to an infra-red-ray LED 34. The digital-modulated infrared-ray signals from the respective infrared-ray LEDs 34 of the two racket input devices 80 are received by the infrared-ray receiver 30' of the game machine 12, and then digital-demodulated and inputted to the game processor 40. The digital signal in an amount of 1 bit is transmitted as "1" or "0" depending upon on or off of a switch 82. Consequently, the game processor 40 checks the bit, thereby determining which game player has put a serve ball.

In the sensing table-tennis game apparatus 100, in brief the game machine 12, or game processor 40, receives acceleration data contained in the infrared-ray signals from the two racket input devices 80 and determines a moving speed of the racket input device 80. When the moving speed reaches a peak, the game processor 40 determines a parameter of ball a43 movement to move the ball a43 in the game scene according to the parameter.

Figure 16:
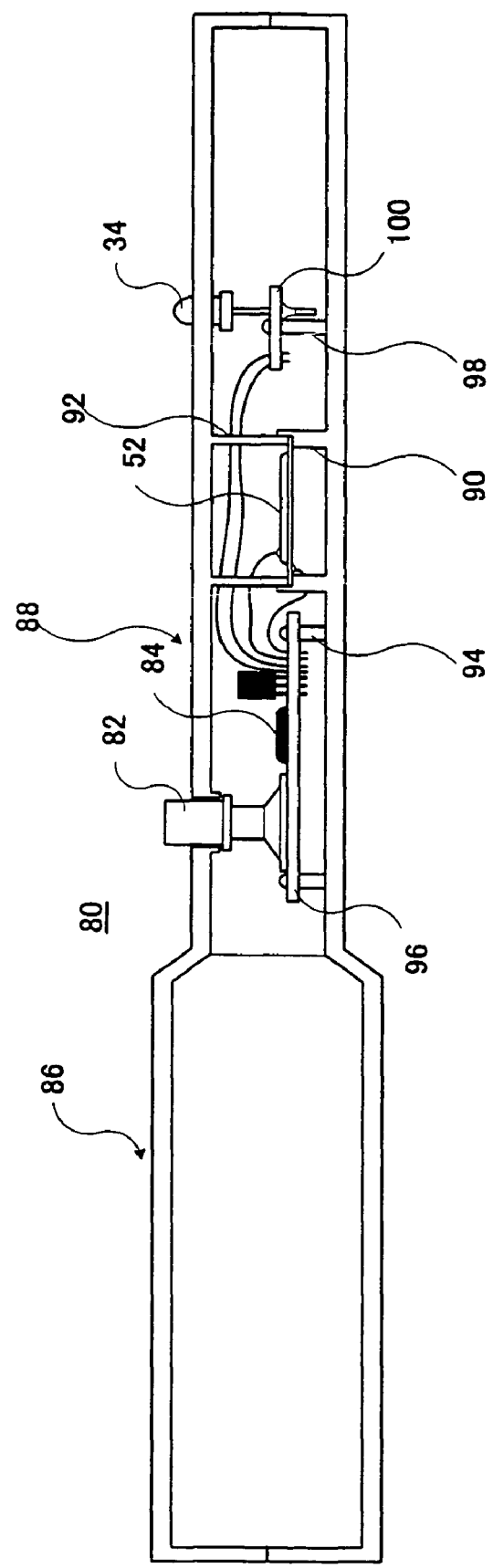
FIG. 16 is an illustrative view showing an example of a racket input device used in the FIG. 13 embodiment.

The racket input device 80 includes a grip part 86 and a ball-hitting part 88 extending from a tip of the grip, as shown in FIG. 16. These grip part 86 and ball-hitting part 88 are integrally formed, for example, by a two-split plastic housing. Bosses 90 and 92 are formed in an interior of the ball-hitting part 88 of the plastic housing of the racket input device 80, to bond together the two-split housing parts. The boss 90 is further fixed with a piezoelectric buzzer 52 serving as an acceleration sensor 56 (FIG. 15). In the lower housing, a boss 94 is further formed to mount a printed circuit board 96 on the boss 94. A switch 82 and MCU 84 shown in FIG. 15 is attached on the printed board 96. In the lower housing, a boss 98 is further formed to fixed thereon an LED board 100. On the LED board 100, an infrared-ray LED 34 is attached. Incidentally, electrical connection is provided between the piezoelectric buzzer, or acceleration sensor 56, the MCU 84, the switch 82 and the infrared-ray LED 34, as shown in FIG. 15.

Figure 17:
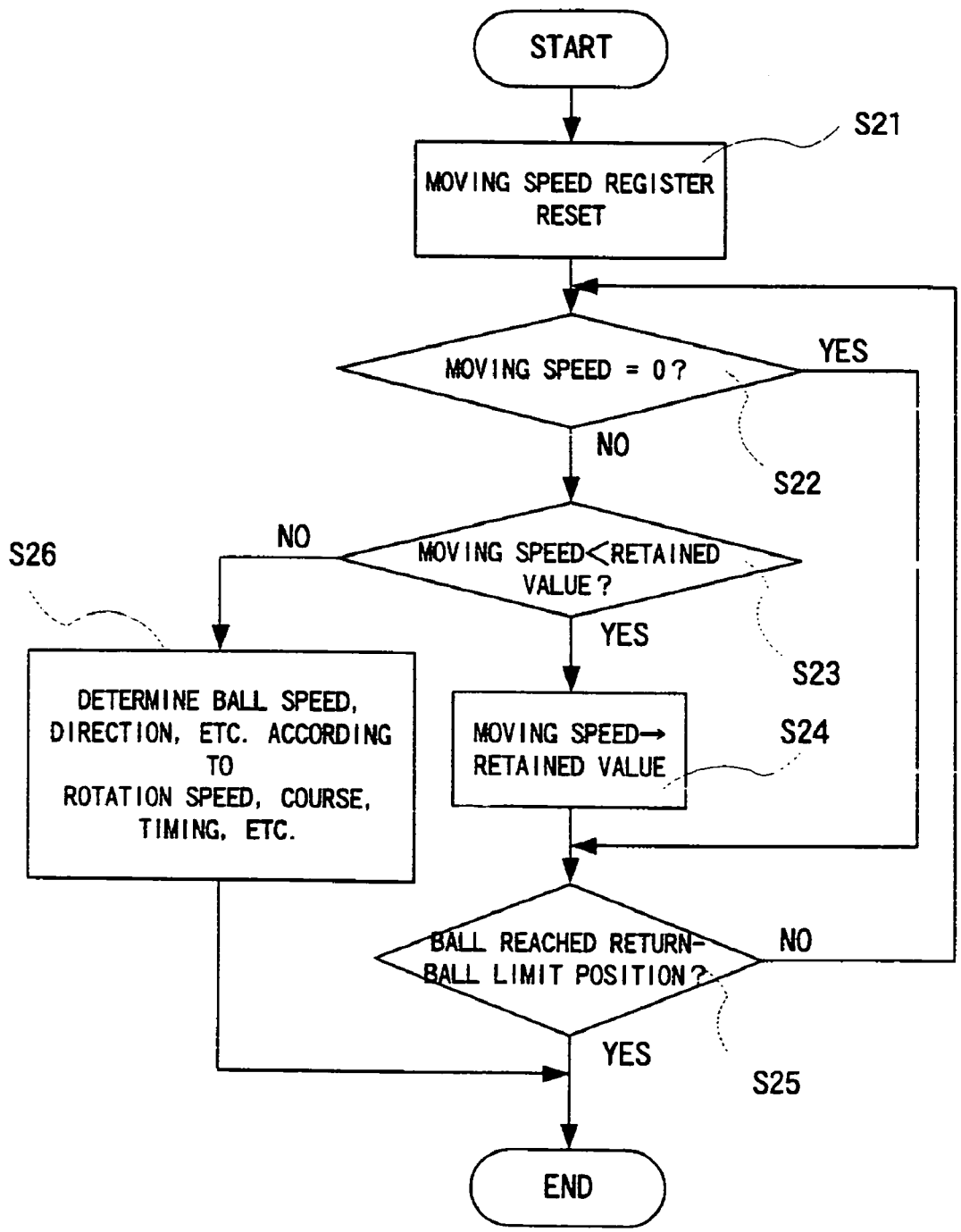
FIG. 17 is a flowchart showing an operation of swinging the racket input device in the FIG. 13 embodiment.

Referring to FIG. 17, explanation is made on the operation that a moving speed of the racket input device 80 is detected to hit back the ball a43 (FIG. 14). In the first step S21, the game processor 40 resets a moving speed value for the racket input device 80 retained in the moving speed register (not shown) formed in the internal memory 42 (FIG. 15).

Thereafter, the game processor 40 in step S22 fetches a moving speed as determined in FIG. 7 and determines whether the fetched moving speed is "0" or not, i.e. whether the game player has swung the racket input device 80 or not. If the game player has swung the racket input device 80, the moving speed is not "0" and hence the process proceeds to the next step S23. When the moving speed is "0", the process proceeds to step S25.

In the step S23, the game processor 40 determines whether the fetched moving speed is smaller than the value retained in the moving speed register (moving speed<retained value) or not. In the beginning of swinging of the racket input device 80, the moving speed gradually increases, and accordingly "NO" is determined in this step S23. Accordingly, the game processor 40 replaces the retained value in the moving speed register with a moving speed at that time. That is, the moving speed is updated of its retained value.

In the advance of swing of the racket input device 80, the moving speed soon reaches a peak and then gradually decreases. It can be determined in the step S23 whether the moving speed of the racket input device 80 has reached a peak or not.

Subsequently, the game processor 40 determines whether the ball a43 (FIG. 14) has reached a ball-return limit position or not. This determination can be made by detecting whether the ball a43 in depth position (known by the CPU) has moved to a position assumed as a ball-return limit or not.

The fact of determination "YES" in the step S23 before the ball a43 has reached the ball-return limit position means that no peak of the moving speed has detected before reaching the ball-return limit position after hitting back of the ball a43 or hitting a serve ball a43 by the opponent player. In other words, this means a disagreement between the timing of swinging the racket input device 80 by the game player and the timing of movement of the ball a43, i.e. the swing was after the ball a43 has reached the ball-return limit position. In this case, the game processor 40 determines as "missed swing". However, the moving speed remaining "0" in the step S22 means that the racket input device 80 has not been swung. In this case, the game processor 40 will determine as out ball or safe ball, by whether the ball a43 reach position is on the ping-pong table a51 (FIG. 14) or not.

The steps S22 to S24 are repeated until the ball a43 has reached the ball-return limit position. In this process, if "YES" is determined in step S23, then it means that the moving speed due to swing of the racket input device 80 has reached a peak. In this case, in step S26 game processor 40 determines the parameters of a moving speed in a reverse direction, a direction and the like of the ball a43 hit back by the racket. The ball a43 is moved according to the parameters thus determined.

According to the FIG. 13 embodiment, when the game player swings the racket input device 80 to a ball movement in the game scene, a moving speed of the input device 80 is detected to hit back the ball according to the speed and timing thereof, thereby moving the ball as a hit ball in the game scene. In accordance with a position to which the ball moves, etc., determination is made as out ball or safe ball just like in a usual table-tennis game. Accordingly, in this embodiment, the game player is allowed to swing the racket input device 80, thereby enjoying a realistic feeling that could not have been experienced in the conventional television game.

Figure 18:
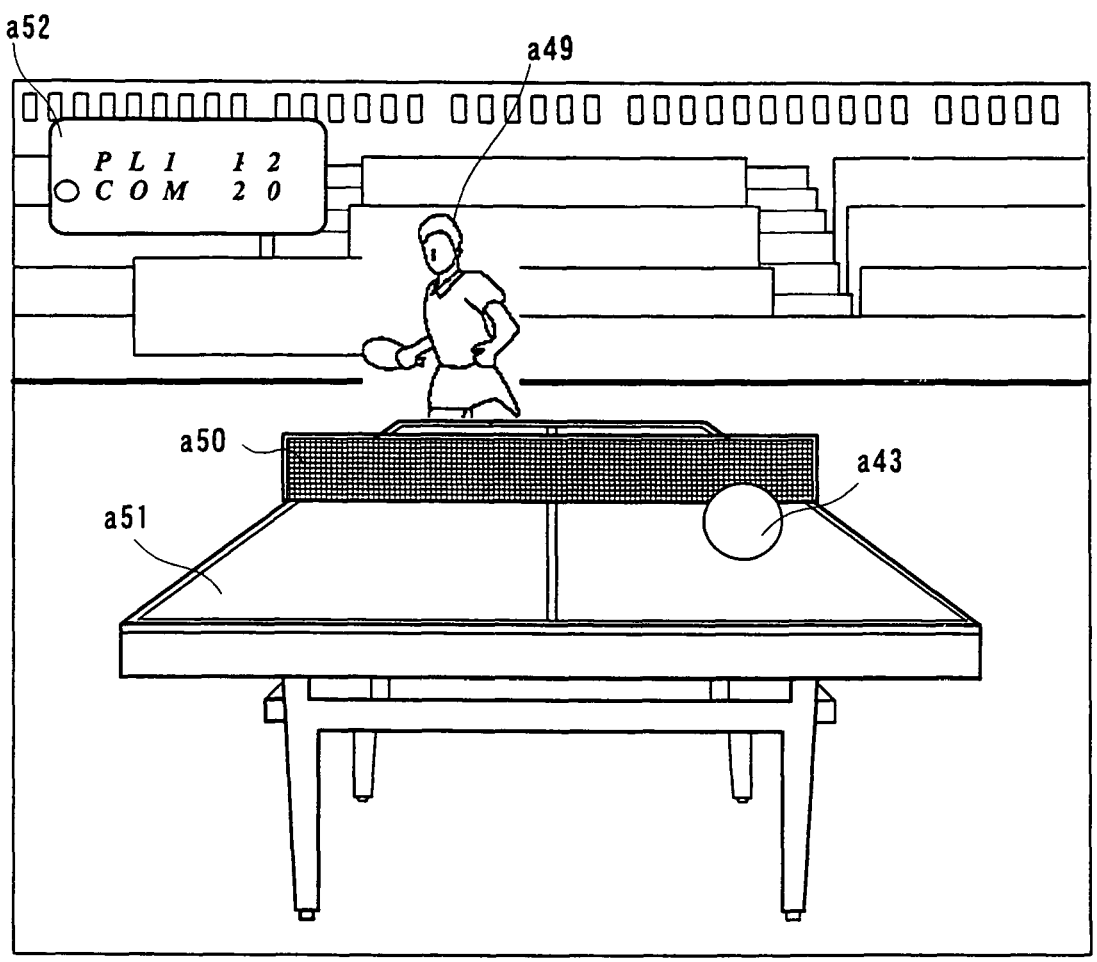
FIG. 18 is an illustrative view showing an example of a game screen in a sensing table-tennis game to be played in a modification to the FIG. 13 embodiment.

Incidentally, the FIG. 13 embodiment showed the competition-type sensing table-tennis game apparatus using to racket input devices 80. However, it is possible to enjoy a "single play" using only one racket input device 80. The game screen in this case displays, in the entire screen, one athlete a49, one ball a43, one net a50 and one ping-pong table, as shown in FIG. 18. However, background images such as spectator seats may be displayed if required. In the case of a "single play", hitting back by the athlete a49 will be under control of the game processor a40. Incidentally, although only one acceleration sensor was provided in the racket input device 80, the provision of four or at least three acceleration sensors enables detection of an X-axis (left and right) direction and a Y-axis (forward and backward) direction of the ball-hitting part 88. This will achieve higher level of control, thus making possible to make the game more interesting.

The foregoing embodiments concretely explained on the baseball and table-tennis games. However, this invention is also applicable to desired ball games that an input device to be moved or displaced in the three-dimensional space by the game player is used to cause a change in the ball character on the game scene according to an acceleration (moving speed or displacing speed) of the input device.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A body-sensing game apparatus for playing by first and second game players a game by displaying a character on a screen of a display, comprising:

a first input device to be grasped and moved in a three-dimensional space by said first game player;

a second input device to be grasped and moved in a three-dimensional space by said second game player;

first signal output means incorporated in said first input device to output a first acceleration correlated signal according to an acceleration upon moving said first input device in the three-dimensional space;

second signal output means incorporated in said second input device to output a second acceleration correlated signal according to an acceleration upon moving said second input device in the three-dimensional space;

first control means for making a change on said character in accordance with said first acceleration correlated signal; and second control means for making, in accordance with said second acceleration correlated signal, a change on said character that is made to be changed by said first control means, wherein said first control means makes, in accordance with said first acceleration correlated signal, a change on said character that is made to be changed by said second control means, wherein said first control means determines, when said character hit-back by said second acceleration correlated signal of said second input device reaches a first ball return limit position, an out ball or safe ball in accordance with whether or not a reach position of said character is on a table character, at a time it is determined based on said first acceleration correlated signal that said first input device was not swung, and said second control means determines, when said character hit-back by said first acceleration correlated signal of said first input device reaches a second ball-return limit position, an out ball or safe ball in accordance with whether or not a reach position of said character is on a table character, at a time it is determined based on said second acceleration correlated signal that said second input device was not swung.

2. A body-sensing game apparatus according to claim 1, wherein said first input device and said second input device are respectively provided with serve switches.

3. A body-sensing game apparatus according to claim 1, wherein said game is a ping-pong game, and said first input device and said second input device are respectively racket-type input devices.

4. A method for controlling a body-sensing ball game played on a game apparatus for playing by first and second game players a game by displaying a character on a screen of a display, said game apparatus comprising a first input device to be grasped and moved in a three-dimensional space by said first game player, a second input device to be grasped and moved in a three-dimensional space by said second game player, first signal output means incorporated in said first input device to output a first acceleration correlated signal according to an acceleration upon moving said first input device in the three-dimensional space, and second signal output means incorporated in said second input device to output a second acceleration correlated signal according to an acceleration upon moving said second input device in the three-dimensional space, the method comprising steps of:

making a change on said character in accordance with said first acceleration correlated signal;

making, in accordance with said second acceleration correlated signal, a change on said character that is made to be changed by said step of making a change in accordance with said first acceleration correlated signal;

making, in accordance with said first acceleration correlated signal, a change on said character that is made to be changed by said second control means;

determining, when said character hit-back by said second acceleration correlated signal of said second input device reaches a first ball return limit position, an out ball or safe ball in accordance with whether or not a reach position of said character is on a table character, at a time it is determined based on said first acceleration correlated signal that said first input device was not swung; and determining, when said character hit-back by said first acceleration correlated signal of said first input device reaches a second ball-return limit position, an out ball or safe ball in accordance with whether or not a reach position of said character is on a table character, at a time it is determined based on said second acceleration correlated signal that said second input device was not swung.

5. A non-transitory computer-readable medium storing a computer program that when executed by a computer performs a process, said process comprising:

displaying a character on a screen of a display;

receiving a first acceleration correlated signal corresponding to an acceleration of a first input device grasped and moved in a three-dimensional space by a first game player;

receiving a second acceleration correlated signal corresponding to an acceleration of a second input device grasped and moved in a three-dimensional space by a second game player;

making a change on said character in accordance with said first acceleration correlated signal;

making, in accordance with said second acceleration correlated signal, a change on said character that is made to be changed by said step of making a change in accordance with said first acceleration correlated signal;

making, in accordance with said first acceleration correlated signal, a change on said character that is made to be changed by said step of making a change in accordance with the second acceleration correlated signal;

determining, when said character hit-back by said second acceleration correlated signal of said second input device reaches a first ball return limit position, an out ball or safe ball in accordance with whether or not a reach position of said character is on a table character, at a time it is determined based on said first acceleration correlated signal that said first input device was not swung; and determining, when said character hit-back by said first acceleration correlated signal of said first input device reaches a second ball-return limit position, an out ball or safe ball in accordance with whether or not a reach position of said character is on a table character, at a time it is determined based on said second acceleration correlated signal that said second input device was not swung.

6. A body-sensing ball game apparatus for playing by a game player a game by displaying a ball character on a screen of a display, comprising:

an input device to be grasped and moved in a three dimensional space by a game player;

a signal output unit incorporated in the input device to output an acceleration correlated signal according to an acceleration upon moving the input device in the three dimensional space; and a control unit that causes a change of the ball character being displayed on the screen on the basis of the acceleration correlated signal, wherein the control unit determines, when the ball character hit-back by an opponent player reaches a ball return limit position, an out ball or safe ball in accordance with whether or not a reach position of the ball character is on a table character, at a time it is determined based on the acceleration correlated signal that the input device was not swung.

7. A body-sensing ball game apparatus according to claim 6 wherein the input device includes a serve switch.

8. A method for controlling a body-sensing game played by a game player on a game apparatus for playing a game by displaying a ball character on a screen of a display, the game apparatus comprising an input device to be grasped and moved in a three dimensional space by a game player; and a signal output unit incorporated in the input device to output an acceleration correlated signal according to an acceleration upon moving the input device in the three dimensional space, the method comprising steps of:

causing a change of the ball character being displayed on the screen on the basis of the acceleration correlated signal; and determining, when the ball character hit-back by an opponent player reaches a ball return limit position, an out ball or safe ball in accordance with whether or not a reach position of the ball character is on a table character, at a time it is determined based on the acceleration correlated signal that the input device was not swung.

9. A non-transitory computer-readable medium storing a computer program that when executed by a computer performs a process, the process comprising:

displaying a ball character on a screen of a display;

receiving an acceleration correlated signal corresponding to an acceleration of a a first input device grasped and moved in a three-dimensional space by a first game player;

causing a change of the ball character being displayed on the screen on the basis of the acceleration correlated signal; and determining, when the ball character hit-back by an opponent player reaches a ball return limit position, an out ball or safe ball in accordance with whether or not a reach position of the ball character is on a table character, at a time it is determined based on the acceleration correlated signal that the input device was not swung.

* * * * *